United States Patent
Zhao

(10) Patent No.: US 10,616,162 B1
(45) Date of Patent: Apr. 7, 2020

(54) SYSTEMS DEVICES AND METHODS FOR AUTOMATICALLY SELECTING AN EPHEMERAL MESSAGE AVAILABILITY

(71) Applicant: Snap Inc., Santa Monica, CA (US)

(72) Inventor: Haibo Zhao, Venice, CA (US)

(73) Assignee: Snap Inc., Santa Monica, CA (US)

( * ) Notice: Subject to any disclaimer, the term of this patent is extended or adjusted under 35 U.S.C. 154(b) by 775 days.

(21) Appl. No.: 14/833,556

(22) Filed: Aug. 24, 2015

(51) Int. Cl.
*H04L 12/58* (2006.01)

(52) U.S. Cl.
CPC ............. *H04L 51/18* (2013.01); *H04L 51/10* (2013.01)

(58) Field of Classification Search
CPC ................................ H04L 51/18; H04L 51/10
USPC .......................................................... 709/206
See application file for complete search history.

(56) References Cited

U.S. PATENT DOCUMENTS

| | | | |
|---|---|---|---|
| 5,754,939 A | 5/1998 | Herz et al. |
| 6,038,295 A | 3/2000 | Mattes |
| 6,158,044 A | 12/2000 | Tibbetts |
| 6,167,435 A | 12/2000 | Druckenmiller et al. |
| 6,205,432 B1 | 3/2001 | Gabbard et al. |
| 6,310,694 B1 | 10/2001 | Okimoto et al. |
| 6,484,196 B1 | 11/2002 | Maurille |
| 6,487,586 B2 | 11/2002 | Ogilvie et al. |
| 6,665,531 B1 | 12/2003 | Soderbacka et al. |
| 6,701,347 B1 | 3/2004 | Ogilvie |
| 6,711,608 B1 | 3/2004 | Ogilvie |
| 6,757,713 B1 | 6/2004 | Ogilvie et al. |
| 6,980,909 B2 | 12/2005 | Root et al. |
| 7,124,164 B1 | 10/2006 | Chemtob |
| 7,149,893 B1 | 12/2006 | Leonard et al. |
| 7,173,651 B1 | 2/2007 | Knowles |
| 7,243,163 B1 | 7/2007 | Friend et al. |

(Continued)

FOREIGN PATENT DOCUMENTS

| | | | |
|---|---|---|---|
| CA | 2887596 A1 | 7/2015 |
| WO | WO-2012000107 A1 | 1/2012 |

(Continued)

OTHER PUBLICATIONS

"How Snaps Are Stored and Deleted", Snapchat, [Online]. Retrieved from the Internet: <URL: https://web.archive.org/web/20130607042322/http://blog.snapchat.comtpost/50060403002/how-snaps-are-stored-and-deleted, (May 9, 2013), 2 pgs.

(Continued)

*Primary Examiner* — James E Springer
(74) *Attorney, Agent, or Firm* — Schwegman Lundberg & Woessner, P.A.

(57) ABSTRACT

Methods and devices are presented for managing communications in an ephemeral communication system. In some embodiments, messages in the system are analyzed to determine a complexity value for the message. This may be based on various algorithms, models, or system associations. The complexity information may then be used to recommend an availability value for the message, and to set a deletion trigger for the message based on the recommended availability value. When criteria of the automatically set deletion trigger are met at a device receiving the message, the message is automatically deleted from the device. In some embodiments, this deletion trigger at the device may also be used to initiate deletion of the message from other parts of the system.

20 Claims, 12 Drawing Sheets

(56) References Cited

U.S. PATENT DOCUMENTS

| | | |
|---|---|---|
| 7,278,168 B1 | 10/2007 | Chaudhury et al. |
| 7,356,564 B2 | 4/2008 | Hartselle et al. |
| 7,376,715 B2 | 5/2008 | Cunningham et al. |
| 7,411,493 B2 | 8/2008 | Smith |
| 7,478,402 B2 | 1/2009 | Christensen et al. |
| 7,496,347 B2 | 2/2009 | Puranik |
| 7,519,670 B2 | 4/2009 | Hagale et al. |
| 7,535,890 B2 | 5/2009 | Rojas |
| 7,607,096 B2 | 10/2009 | Oreizy et al. |
| 7,703,140 B2 | 4/2010 | Nath et al. |
| 7,912,896 B2 | 3/2011 | Wolovitz et al. |
| 8,131,597 B2 | 3/2012 | Hudetz |
| 8,170,957 B2 | 5/2012 | Richard |
| 8,199,747 B2 | 6/2012 | Rojas et al. |
| 8,214,443 B2 | 7/2012 | Hamburg |
| 8,238,947 B2 | 8/2012 | Lottin et al. |
| 8,244,593 B2 | 8/2012 | Klinger et al. |
| 8,312,097 B1 | 11/2012 | Siegel et al. |
| 8,332,475 B2 | 12/2012 | Rosen et al. |
| 8,570,907 B2 | 10/2013 | Garcia, Jr. et al. |
| 8,718,333 B2 | 5/2014 | Wolf et al. |
| 8,724,622 B2 | 5/2014 | Rojas |
| 8,745,132 B2 | 6/2014 | Obradovich |
| 8,874,677 B2 | 10/2014 | Rosen et al. |
| 8,909,679 B2 | 12/2014 | Root et al. |
| 8,909,714 B2 | 12/2014 | Agarwal et al. |
| 8,909,725 B1* | 12/2014 | Sehn ................ H04L 67/26 709/206 |
| 8,914,752 B1 | 12/2014 | Spiegel |
| 8,995,433 B2 | 3/2015 | Rojas |
| 9,040,574 B2 | 5/2015 | Wang et al. |
| 9,055,416 B2 | 6/2015 | Rosen et al. |
| 9,083,770 B1 | 7/2015 | Drose et al. |
| 9,094,137 B1 | 7/2015 | Sehn et al. |
| 9,100,806 B2 | 8/2015 | Rosen et al. |
| 9,100,807 B2 | 8/2015 | Rosen et al. |
| 9,113,301 B1 | 8/2015 | Spiegel et al. |
| 9,148,424 B1 | 9/2015 | Yang |
| 9,191,776 B2 | 11/2015 | Root et al. |
| 9,204,252 B2 | 12/2015 | Root |
| 9,225,805 B2 | 12/2015 | Kujawa et al. |
| 9,225,897 B1 | 12/2015 | Sehn et al. |
| 9,237,202 B1* | 1/2016 | Sehn ................ H04L 67/26 |
| 9,264,463 B2 | 2/2016 | Rubinstein et al. |
| 9,276,886 B1 | 3/2016 | Samaranayake |
| 9,294,425 B1 | 3/2016 | Son |
| 9,385,983 B1 | 7/2016 | Sehn |
| 9,396,354 B1 | 7/2016 | Murphy et al. |
| 9,407,712 B1* | 8/2016 | Sehn ................ H04L 67/26 |
| 9,407,816 B1 | 8/2016 | Sehn |
| 9,430,783 B1 | 8/2016 | Sehn |
| 9,443,227 B2 | 9/2016 | Evans et al. |
| 9,482,882 B1 | 11/2016 | Hanover et al. |
| 9,482,883 B1 | 11/2016 | Meisenholder |
| 9,489,661 B2 | 11/2016 | Evans et al. |
| 9,491,134 B2 | 11/2016 | Rosen et al. |
| 9,532,171 B2 | 12/2016 | Allen et al. |
| 9,537,811 B2 | 1/2017 | Allen et al. |
| 9,560,006 B2 | 1/2017 | Prado et al. |
| 9,628,950 B1 | 4/2017 | Noeth et al. |
| 9,652,896 B1 | 5/2017 | Jurgenson et al. |
| 9,659,244 B2 | 5/2017 | Anderton et al. |
| 9,693,191 B2 | 6/2017 | Sehn |
| 9,705,831 B2 | 7/2017 | Spiegel |
| 9,710,669 B2* | 7/2017 | Moskowitz ............ G06F 21/10 |
| 9,742,713 B2 | 8/2017 | Spiegel et al. |
| 9,785,796 B1 | 10/2017 | Murphy et al. |
| 9,825,898 B2 | 11/2017 | Sehn |
| 9,854,219 B2 | 12/2017 | Sehn |
| 9,961,520 B2 | 5/2018 | Brooks et al. |
| 2002/0047868 A1 | 4/2002 | Miyazawa |
| 2002/0144154 A1 | 10/2002 | Tomkow |
| 2003/0052925 A1 | 3/2003 | Daimon et al. |
| 2003/0126215 A1 | 7/2003 | Udell |
| 2003/0217106 A1 | 11/2003 | Adar et al. |
| 2004/0012576 A1* | 1/2004 | Cazier ................ G06T 11/00 345/204 |
| 2004/0015444 A1* | 1/2004 | Gueh ................ G06F 21/10 705/51 |
| 2004/0203959 A1 | 10/2004 | Coombes |
| 2005/0097176 A1 | 5/2005 | Schatz et al. |
| 2005/0138407 A1* | 6/2005 | Choudhary ............ G06F 21/10 726/26 |
| 2005/0198128 A1 | 9/2005 | Anderson |
| 2005/0223066 A1 | 10/2005 | Buchheit et al. |
| 2006/0242239 A1 | 10/2006 | Morishima et al. |
| 2006/0270419 A1 | 11/2006 | Crowley et al. |
| 2006/0277151 A1* | 12/2006 | Sankaran ................ G06F 21/10 705/59 |
| 2007/0038715 A1 | 2/2007 | Collins et al. |
| 2007/0064899 A1 | 3/2007 | Boss et al. |
| 2007/0073823 A1 | 3/2007 | Cohen et al. |
| 2007/0214216 A1 | 9/2007 | Carrer et al. |
| 2007/0233801 A1 | 10/2007 | Eren et al. |
| 2008/0055269 A1 | 3/2008 | Lemay et al. |
| 2008/0120409 A1 | 5/2008 | Sun et al. |
| 2008/0159403 A1* | 7/2008 | Dunning ............ G06F 17/30814 375/240.21 |
| 2008/0207176 A1 | 8/2008 | Brackbill et al. |
| 2008/0270938 A1 | 10/2008 | Carlson |
| 2008/0306826 A1 | 12/2008 | Kramer et al. |
| 2008/0313346 A1 | 12/2008 | Kujawa et al. |
| 2009/0042588 A1 | 2/2009 | Lottin et al. |
| 2009/0132453 A1 | 5/2009 | Hangartner et al. |
| 2010/0082427 A1 | 4/2010 | Burgener et al. |
| 2010/0131880 A1 | 5/2010 | Lee et al. |
| 2010/0185665 A1 | 7/2010 | Horn et al. |
| 2010/0306669 A1 | 12/2010 | Della Pasqua |
| 2011/0099507 A1 | 4/2011 | Nesladek et al. |
| 2011/0145564 A1 | 6/2011 | Moshir et al. |
| 2011/0202598 A1 | 8/2011 | Evans et al. |
| 2011/0213845 A1 | 9/2011 | Logan et al. |
| 2011/0286586 A1 | 11/2011 | Saylor et al. |
| 2011/0320373 A1 | 12/2011 | Lee et al. |
| 2012/0028659 A1 | 2/2012 | Whitney et al. |
| 2012/0072956 A1* | 3/2012 | Thomas ................ H04N 5/76 725/88 |
| 2012/0184248 A1 | 7/2012 | Speede |
| 2012/0209921 A1 | 8/2012 | Adafin et al. |
| 2012/0209924 A1 | 8/2012 | Evans et al. |
| 2012/0254325 A1 | 10/2012 | Majeti et al. |
| 2012/0278692 A1 | 11/2012 | Shi |
| 2012/0304080 A1 | 11/2012 | Wormald et al. |
| 2013/0006403 A1* | 1/2013 | Moore ................ G06Q 10/101 700/92 |
| 2013/0071093 A1 | 3/2013 | Hanks et al. |
| 2013/0194301 A1* | 8/2013 | Robbins ................ G06F 21/60 345/629 |
| 2013/0290443 A1 | 10/2013 | Collins et al. |
| 2014/0032682 A1 | 1/2014 | Prado et al. |
| 2014/0122787 A1 | 5/2014 | Shalvi et al. |
| 2014/0189818 A1* | 7/2014 | Meyer ................ G06F 21/62 726/4 |
| 2014/0201527 A1* | 7/2014 | Krivorot ............ G06F 21/6209 713/168 |
| 2014/0282096 A1* | 9/2014 | Rubinstein ............ H04L 65/403 715/753 |
| 2014/0325383 A1 | 10/2014 | Brown et al. |
| 2014/0359024 A1 | 12/2014 | Spiegel |
| 2014/0359032 A1 | 12/2014 | Spiegel et al. |
| 2015/0180845 A1* | 6/2015 | Uomini ................ H04L 63/083 726/3 |
| 2015/0199082 A1 | 7/2015 | Scholler et al. |
| 2015/0206353 A1* | 7/2015 | Grasso ................ G06T 19/006 345/633 |
| 2015/0222686 A1* | 8/2015 | Aizenstat ............ G11B 27/031 709/204 |
| 2015/0227602 A1 | 8/2015 | Ramu et al. |
| 2015/0373021 A1* | 12/2015 | Tussy ................ H04L 63/0428 713/170 |
| 2016/0042404 A1* | 2/2016 | Joshi ................ H04L 63/102 705/14.55 |
| 2016/0085773 A1 | 3/2016 | Chang et al. |

(56) References Cited

U.S. PATENT DOCUMENTS

| | | |
|---|---|---|
| 2016/0085863 A1 | 3/2016 | Allen et al. |
| 2016/0086670 A1 | 3/2016 | Gross et al. |
| 2016/0099901 A1 | 4/2016 | Allen et al. |
| 2016/0164816 A1* | 6/2016 | Bhagwan ............... H04L 51/18 709/206 |
| 2016/0180887 A1 | 6/2016 | Sehn |
| 2016/0191442 A1* | 6/2016 | Penilla .................. H04L 51/22 709/206 |
| 2016/0277419 A1 | 9/2016 | Allen et al. |
| 2016/0321708 A1 | 11/2016 | Sehn |
| 2016/0357946 A1* | 12/2016 | Myman ................ G06F 21/606 |
| 2016/0359773 A1* | 12/2016 | Shi ........................ H04L 51/04 |
| 2016/0359779 A1* | 12/2016 | Shi ....................... H04L 51/046 |
| 2016/0359957 A1 | 12/2016 | Laliberte |
| 2016/0359987 A1 | 12/2016 | Laliberte |
| 2017/0161382 A1 | 6/2017 | Ouimet et al. |
| 2017/0263029 A1 | 9/2017 | Yan et al. |
| 2017/0287006 A1 | 10/2017 | Azmoodeh et al. |
| 2017/0295250 A1 | 10/2017 | Samaranayake et al. |
| 2017/0374003 A1 | 12/2017 | Allen et al. |
| 2017/0374508 A1 | 12/2017 | Davis et al. |

FOREIGN PATENT DOCUMENTS

| | | |
|---|---|---|
| WO | WO-2013008251 A2 | 1/2013 |
| WO | WO-2014194262 A2 | 12/2014 |
| WO | WO-2015192026 A1 | 12/2015 |
| WO | WO-2016054562 A1 | 4/2016 |
| WO | WO-2016065131 A1 | 4/2016 |
| WO | WO-2016/112299 A1 | 7/2016 |
| WO | WO-2016179166 A1 | 11/2016 |
| WO | WO-2016179235 A1 | 11/2016 |
| WO | WO-2017176739 A1 | 10/2017 |
| WO | WO-2017176992 A1 | 10/2017 |
| WO | WO-2018005644 A1 | 1/2018 |

OTHER PUBLICATIONS

"iVisit Mobile Getting Started", IVISIT, (Dec. 4, 2013), 1-16.

Leyden, John, "This SMS will self-destruct in 40 seconds", [Online]. Retrieved from the Internet: <URL: http://www.theregister.co.uk/2005/12/121stealthtext/, (Dec. 12, 2005), 1 pg.

Melanson, Mike, "This text message will self destruct in 60 seconds", readwrite.com, [Online]. Retrieved from the Internet: <http://readwrite.com/2011/02/11/this_text_message_will_self_destruct_in_60__seconds>, (Feb. 18, 2015).

Sawers, Paul, "Snapchat for ios lets you send photos to friends and set how long they're visible for", http ://thenextweb.com/apps/2012/05/07/ snapchat-for-ios-lets-you-send-photos-to-f riends-and-set-how-long-theyre-visible-for, (May 2012), 1-3 pgs.

Shein, Esther, "Ephmeral Data", Communications of the ACM vol. 56 | No. 9, (Sep. 2013), 20-22.

Castelluccia, Claude, et al., "EphPub: Toward robust Ephemeral Publishing", 19th IEEE International Conference on Network Protocols (ICNP), (Oct. 17, 2011), 18 pgs.

Fajman, "An Extensible Message Format for Message Disposition Notifications", Request for Comments: 2298, National Institutes of Health, (Mar. 1998), 28 pgs.

Sawers, Paul, "Snapchat for iOS Lets You Send Photos to Friends and Set How long They're Visible for", TNW, URL: https://thenextweb.com/apps/2012/05/07/snapchat-for-ios-lets-you-send-photos-to-friends-and-set-how-long-theyre-visible-for/, (May 7, 2012), 5 pgs.

Vaas, Lisa, "StealthText, Should You Choose to Accept It", eWEEK, URL: http://www.eweek.com/print/c/a/MessagingandCollaboration/StealthTextShouldYouChoosetoAcceptIt, (Dec. 13, 2005), 2 pgs.

* cited by examiner

SYSTEMS DEVICES AND METHODS FOR AUTOMATICALLY SELECTING AN EPHEMERAL MESSAGE AVAILABILITY

BACKGROUND

Electronic communications, such as e-mail or text messages, images, video, multimedia, etc., over networks, such as the Internet, can be a very convenient means of communication. However, security concerns can limit the appeal of such communications. For example, while encryption may provide a degree of privacy and security for a message while the message is in transit, once the message is received by recipients, the sender of the message typically loses control over how the message is dealt with by the recipients. For example, a message sender may only wish the recipient to be in possession of the message for a specific period of time, but the recipient may choose to retain the message in his or her message store beyond that period.

BRIEF DESCRIPTION OF THE DRAWINGS

Various ones of the appended drawings merely illustrate example embodiments of the present disclosure and should not be considered as limiting its scope.

DETAILED DESCRIPTION

Figure 1:
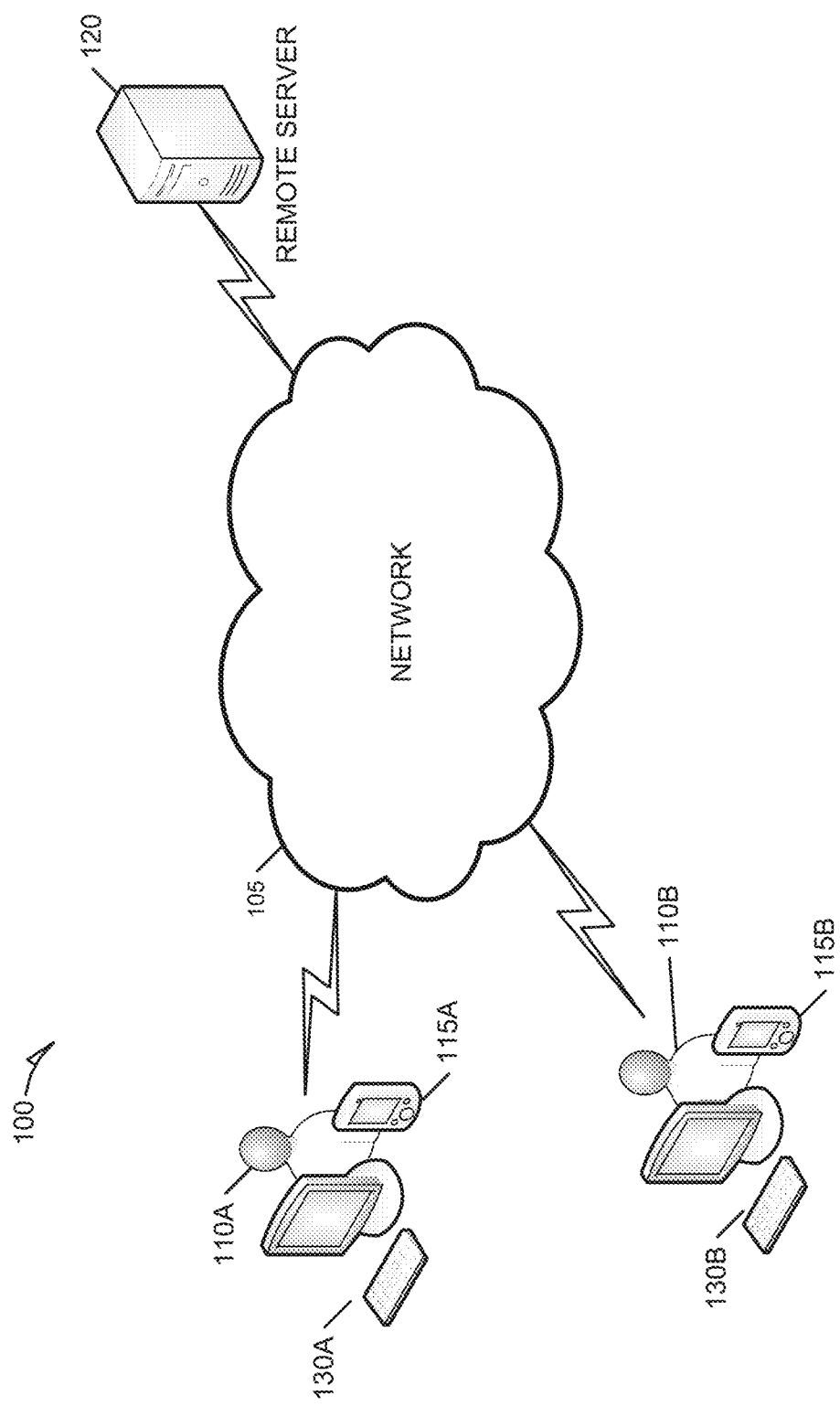
FIG. 1 is a diagram illustrating a networked system that may be used for communications according to some example embodiments.

The description that follows includes details of devices and methods related to managing messages in a communication system. In the following description, for the purposes of explanation, numerous specific details are set forth in order to provide an understanding of various embodiments. It will be evident, however, that additional embodiments that are not specifically described are also possible in accordance with the present innovations. In general, well-known instruction instances, protocols, structures, and techniques are not necessarily shown in detail.

Some embodiments relate to devices and instructions executed by one or more processors of a device to manage messages in a communication system designed for ephemeral messages. As described herein, a communication system for ephemeral messages is a system that is designed to limit recipient access to some or all messages communicated using the system. For example, some ephemeral message systems may be configured to automatically delete a message with a picture after the picture has been displayed on a screen for a certain amount of time. An ephemeral message including a video may include a trigger to automatically delete the video after it has been viewed a set number of times or within a set time after the first viewing. Some ephemeral message systems may be configured to automatically delete a chat message when a user navigates away from a user interface element presenting the chat message. Other embodiments can limit access to messages in other ways, or may use different combinations of limitations.

Message availability as described herein refers to the limits placed on a message recipient's ability to access a message, as well as the subsequent deletion of the message from the system. Such limits are what make a message "ephemeral." An availability recommendation based on an analysis is a set of data characterizing limits on a message recipient's access to an ephemeral message. Message availability limits may be based on a total amount of time that an image or video clip may be viewed for, a number of viewings, other types of limits, or multiple such limits combined together. For example, on availability limitation may allow pausing and skipping within a video clip, with a maximum number of times the clip may be selected, and a maximum total time that any portion of the video clip may be used for. An availability value as described herein may include a description of any one or more limits on the availability of a message, and as described herein may include two or more values, such as a time limit and a number of views or view starts, as part of an availability value created or recommended using a decision model.

In several of the example embodiments described herein, time limits are included as part of a trigger to delete a message and thereby limit an access to a message. Such limits may be set by a message sender, or by a system default settings. If a system allows a default time or a time limit set by a user that generates an ephemeral message, there may be a disconnect between the amount of information in the message and the amount of time a recipient has to view the message. This may particularly impact complex messages or systems where a user falls in to a habit of automatically selecting the same time limit trigger regardless of the content of the message.

Embodiments described herein thus provide systems and methods for analyzing the content of an ephemeral message, and based on the analysis, either recommending or setting deletion triggers based on the content of the message. For example, a first ephemeral message may include a close image of a single face with limited background information. Analysis of the image may identify the single face with limited background information to associate a low complexity value with the message. The complexity value may then be matched to a recommended viewing time or a recommended amount of time that the message is available to a recipient, and a deletion trigger may be set for a short time (e.g. 1-3 seconds) based on the low complexity value of the message.

By contrast, a second ephemeral message may include an image of large group of people taken from a distance with a complex background. Analysis of this second image from the second ephemeral message may identify 20 faces in the image and a high level of additional information in the image. Based on this analysis, a high complexity value can then be associated with the message, and the particular complexity value can be used to associate a longer recommended availability time (e.g. 8+ seconds) and set a deletion trigger based on this longer recommended viewing time for the second image.

Message complexity may be assessed in a variety of different ways, including image and facial recognition analysis for images and video clips, file size information, or other algorithms for assessing the amount of information in a message and an associated expected amount of time for a viewer needs to process the information when it is presented on a display of a device that has received the message. Similarly, once the message complexity is assessed, it may be matched to a particular message deletion trigger in a variety of ways. A table may be used by the system to match complexity values to viewing time values, or a dynamic model using information from user's viewing patterns may be used to generate decisions on recommended availability times. Values for deletion triggers may then either be set automatically, or may be presented as a recommendation to a user with an option to adjust the deletion trigger within a set of system limits.

FIG. 1 is a diagram illustrating a networked system 100 that may be used for communications according to some example embodiments. The networked system 100 is configured to transmit messages between user devices such as mobile devices 115 or other client devices 130 over a network 105 (e.g., the Internet). The mobile devices 115 may comprise smart phones, network-enabled tablets, laptop computers, phablets, vehicle-integrated computers, wearable devices, or any other such mobile computing machines. The other client devices 130 may be more static client devices such as desktop computers, home network devices such as appliances or televisions, or any other such computing devices. These devices include applications, modules, and/or circuitry to enable ephemeral messages to be communicated between the various devices. Additional details related to ephemeral message devices and modules are discussed below.

In various embodiments, device analysis to recommend an availability value for an ephemeral message may be performed in different ways by different devices. In some embodiments, all such processing may be performed by a device receiving a message. In other embodiments, such processing may be performed by a remote server 120 or a device sending a message. In some embodiments, rather than automatically setting a status for a message, an analysis may result in a user prompt presented at a user interface suggesting an availability value with an associated deletion trigger and requesting user approval.

In still further embodiments, a device may include user settings influencing the use of analysis systems. For example, a mobile device 115A may include a setting with a default deletion trigger but with permission to allow a mobile device 115B to modify the trigger for messages sent by the mobile device 115A to the mobile device 115B, with the modification determined by an analysis performed by mobile device 115B using a model customized to a user of mobile device 115B. In other embodiments, the mobile device 115A may include a similar setting to allow the remote server 120 to determine an availability value and an associated deletion trigger for messages sent by the mobile device 115A to the mobile device 115B. In other embodiments, the mobile device 115A may perform an initial analysis to select a deletion trigger or an availability recommendation value prior to sending a message, but may provide permissions to either the remote server 120 or the mobile device 115B to adjust the deletion trigger based on an additional analysis.

In some embodiments, the remote server 120 enables communication between devices, and may store copies of messages as part of system transmission of the messages between users 110 including example user 110A and 110B. In some embodiments, messages may be stored in a non-durable memory of the remote server 120 for a time period before being copied to a durable memory so that messages that are identified as ephemeral and quickly read by the recipients may simply be deleted from the remote server 120. Thus, when a deletion trigger is met at a receiving device to delete an ephemeral message from the device, the ephemeral message may be deleted from the remote server 120 as well. The deletion at the server may occur as a result of a communication from the receiving device following the deletion trigger occurring, or may be based on a separate trigger occurring at the server computer.

Figure 2:
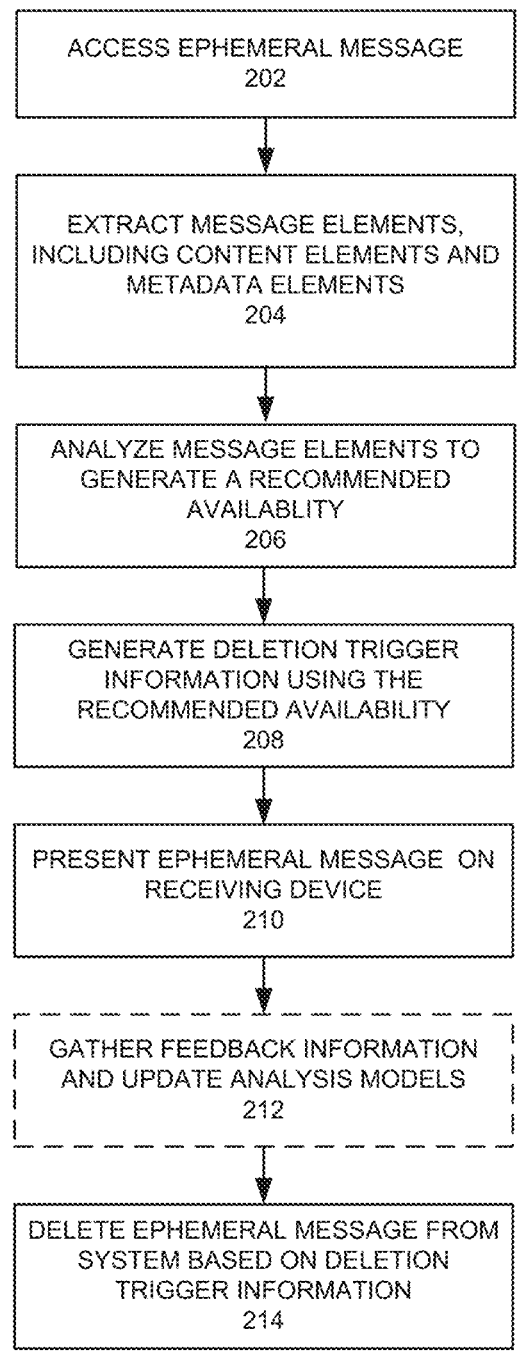
FIG. 2 is a flowchart describing aspects of a system for analyzing and processing messages according to some example embodiments.

FIG. 2 is a flowchart describing aspects of a system for analyzing and processing messages to recommend an availability time and set an associated trigger in an ephemeral communication system. In one embodiment, for example, a method implementing the flowchart of FIG. 2 may be enabled on a mobile device 115B or a client device 130B that is receiving a chat message using computer readable instructions for an ephemeral message system operating on the device, with the message sent by another device such as a mobile device 115A or a client device 130A. In other embodiments, various operations may be performed by different devices, such as where an analysis occurs on a sending device and feedback with deletion operations occur on a receiving device. For the purposes of illustration, FIG. 2 is described with respect to the mobile devices 115A and 115B in the networked system 100 of FIG. 1. It will be apparent that these operations and similar embodiments may be used with other devices or with other systems.

In operation 202, the mobile device 115B accesses an ephemeral message. This message may be received from another device such as mobile device 115A via the network 105 and the remote server 120. Reception of an ephemeral message may use an antenna and wireless communication circuitry for various different wireless technologies as described below. In other embodiments, this access may simply be a memory access operation to access an ephemeral message placed in memory using any process described herein. In operation 204, the mobile device 115B extracts message elements from the ephemeral message. This includes identifying both content elements and metadata elements. These elements may be extracted using various decoding or text parsing modules or elements as part of a device or as part of instructions executed by processors of a device. This information may then be sent to an ephemeral message analysis module that uses the information extracted in operation 204 to set a message status as part of operation 206.

In operation 206 these message elements may be analyzed in a variety of different ways to determine a complexity value for the information in the ephemeral message and an associated availability recommendation. In some embodiments, a single analysis type may be used, but in other embodiments, multiple different types of analysis may be used. For example, image processing analysis may be used to determine an amount of information in a message along with an expected viewing time needed for a user to process the information. An image with 15 people in it will have a higher expected viewing time than an image of a single face with little other background.

Similarly, some embodiments may have analysis customized for individual users based on user inputs and system feedback from previous messages. This may include history information for a particular user viewing images with different levels of complexity in the images, and includes feedback that may be based on the user 110B operating the mobile device 115B. This may also include feedback from the user 110A that generated the message sent from the mobile device 115A, and any other custom information related to previous messages analyzed by the system, including variations in time, content categories, or any other such information from previously analyzed messages. Additional details related to the analysis of an ephemeral message using an ephemeral message analysis module are discussed below with respect to FIG. 5.

Operation 208 then uses information from the analysis of operation 206 to generate deletion trigger information from a recommended availability value and/or the complexity value. Some embodiments, for example, may have one or more tables of stored information to match different complexity values to recommended availability values, with the deletion trigger information simply made up of information to set a deletion trigger to a value indicated by the recommended availability value. For example, a certain complexity value from one or more analysis models may be associated with a recommended availability value of eight seconds. The deletion trigger information may then be any information needed to set the ephemeral message to be deleted from the system after it has been displayed on a screen of device 115B for eight seconds.

Operation 210 then involves mobile device 115B operating to present the ephemeral message on an output of the mobile device 115B. After the deletion trigger has occurred (e.g. display of the ephemeral message content for eight seconds) then the ephemeral message is deleted from the system based on the deletion trigger information in operation 214. In various embodiments, different triggers may be used or multiple triggers may be used. In the embodiment above, a second deletion trigger associated with navigation away from message content may also be used. Thus, if a user 110B initiates display of the ephemeral message on mobile device 115B, but navigates away from the display before eight seconds has passed, the ephemeral message may be deleted even though the eight second trigger has not occurred. In other embodiments with only a single trigger, the user may be allowed to display the ephemeral message for the remaining time before the ephemeral message is deleted.

Optionally, in operation 212, the mobile device 115B may gather feedback information that may be used to update models used in operation 206. For example, if a user navigates away from the ephemeral message prior to an eight second deletion trigger occurring, this information may be used in the system to update future availability recommendations, either globally, for a user specific model, or both. Different models may be managed by remote server 120, by local models operation on mobile device 115B, by both devices, or by any other device in the system in different embodiments. Additionally, instructions or the application operating on the mobile device 115B as part of the ephemeral message system may operate as part of the system to monitor when a message capture action or an unexpected file access or modification occurs with respect to the message content. For example, if a screenshot or other message capture input is received at the mobile device 115B and used to modify or generate a non-ephemeral copy of the message in operation 215, then this information may be captured and used as feedback to modify the models used to select an availability time in operation 216. In some embodiments, this information may also be presented to a sending user at a later time along with a recommended availability for a second message to be sent to the receiving user that generated the non-ephemeral copy of the ephemeral message.

Figure 3A:
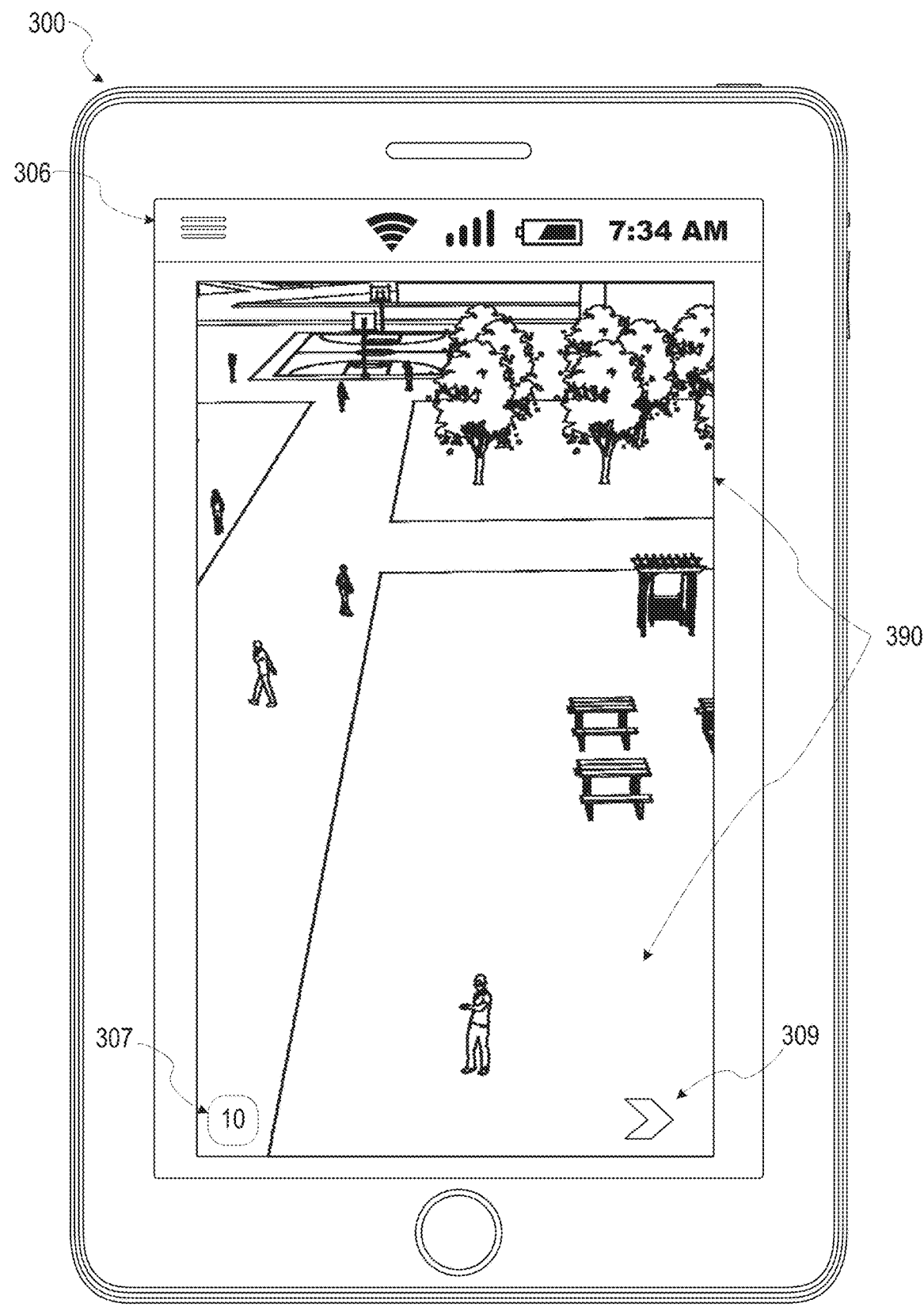
FIG. 3A illustrates aspects of a user interface of a device for use with an ethereal message communication system according to some example embodiments.

FIGS. 3A-D show aspects of a user interface for a device 300 that may be used as part of an ephemeral message communication system as described herein. FIG. 3A shows message device 300 with display area 306, which is a touch screen operating as both an output display and an input device. In addition to various user interface elements, display area displays image 390 which is a content element for a first ephemeral message. FIG. 3A is an example of a device and user interface that may be presented as part of operation of a messaging application on a device in an ephemeral messaging communication system when image 390 is captured by a camera of device 300. Availability interface 307 may be used to indicate aspects of deletion trigger information, and also as a selectable interface to set a deletion trigger or to enable automated analysis for determining a deletion trigger. Message interface 309 may be used to initiate communication of a first ephemeral message containing image 390 to one or more other devices with a deletion trigger based on the deletion trigger information indicated by availability interface 307.

Figure 3B:
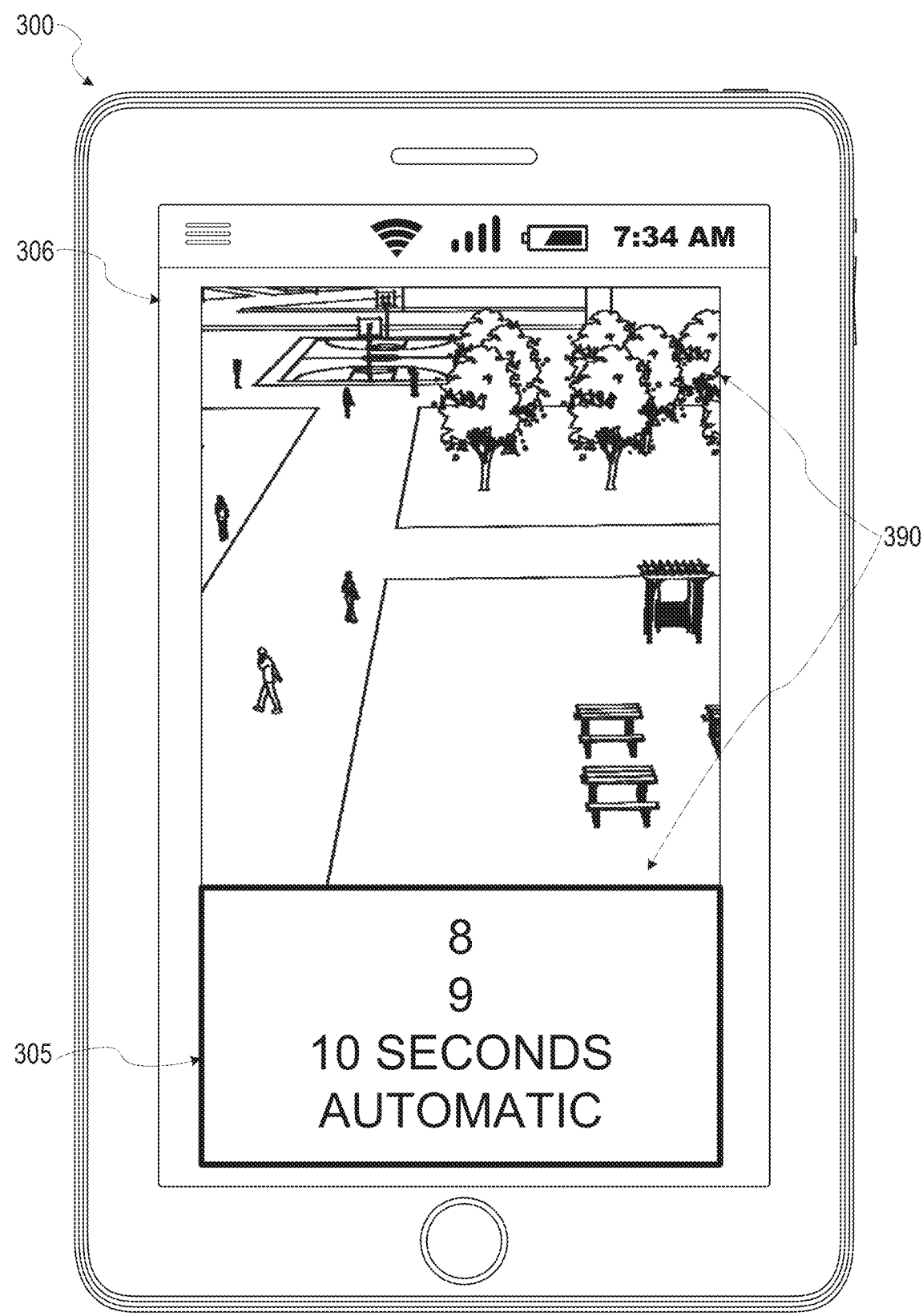
FIG. 3B illustrates additional aspects of the user interface of the device for use with the ethereal message communication system according to the example embodiment of FIG. 3A.

When an input is received at availability interface 307, an availability setting interface 305 may be displayed as illustrated in FIG. 3B. Such an availability setting interface 305 is configured to display availability options, including a setting for an automatic availability recommendation value that can automatically be used to generate deletion trigger information. The availability setting interface 305 may scroll or otherwise present any number of options for an availability of an ephemeral message. For example, one embodiment may include options in one second increments from one second to ten seconds, as well as an automatic setting for a total of eleven options. Other embodiments may include other increments or numbers of settings. A user interface as illustrated in FIGS. 3A and 3C may thus include availability interfaces 307, 313 indicating either a specifically selected availability value, as in availability interface 307, or an automatic recommendation setting as in availability interface 313.

Figure 3C:
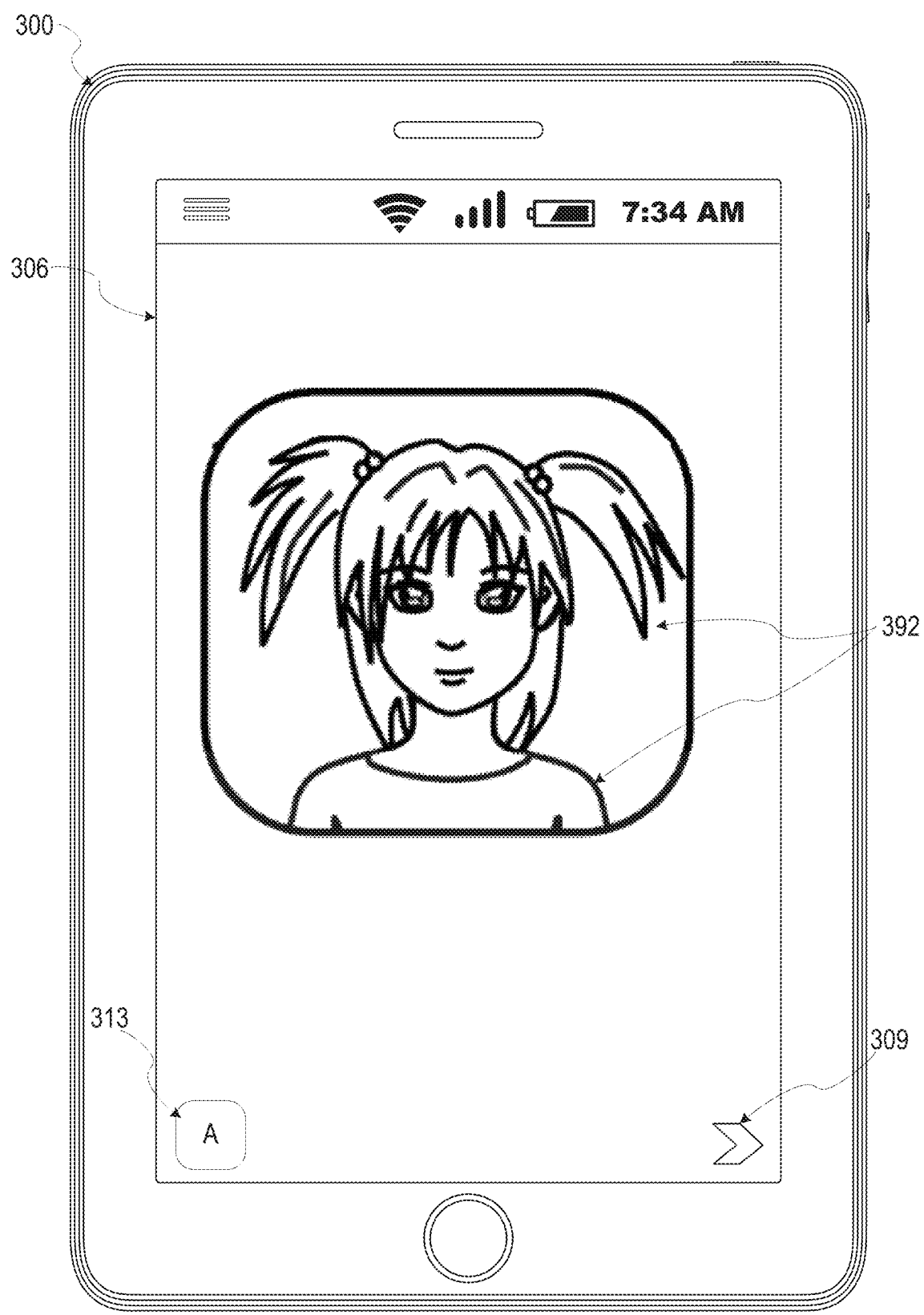
FIG. 3C illustrates additional aspects of the user interface of the device for use with the ethereal message communication system according to the example embodiment of FIGS. 3A and 3B.

In FIG. 3C, which illustrates an interface similar to FIG. 3A, but with image 392, when message interface 309 is selected and any following inputs are received identifying an account or device to send an ephemeral message to, the system may then perform an analysis to recommend or set an availability value and/or a deletion trigger based on an analysis of the message. In some embodiments, this may initiate operations 202-208 on the sending device, with operations 210-214 occurring on a receiving device. In other embodiments, other methods with different arrangements of operations may be used.

Example images 390 of FIG. 3A and 392 of FIG. 3C are two example of images that may be analyzed as part of automatic selection of an availability value. Image 392 includes a single close up image of a face, and may therefore be analyzed as a low complexity image with a recommended availability value at the low end of the availability range. Image 390 includes multiple figures and a large variety of objects. This image may thus be analyzed as a high complexity image with a recommended availability value at a middle or high end of the availability range.

Figure 3D:
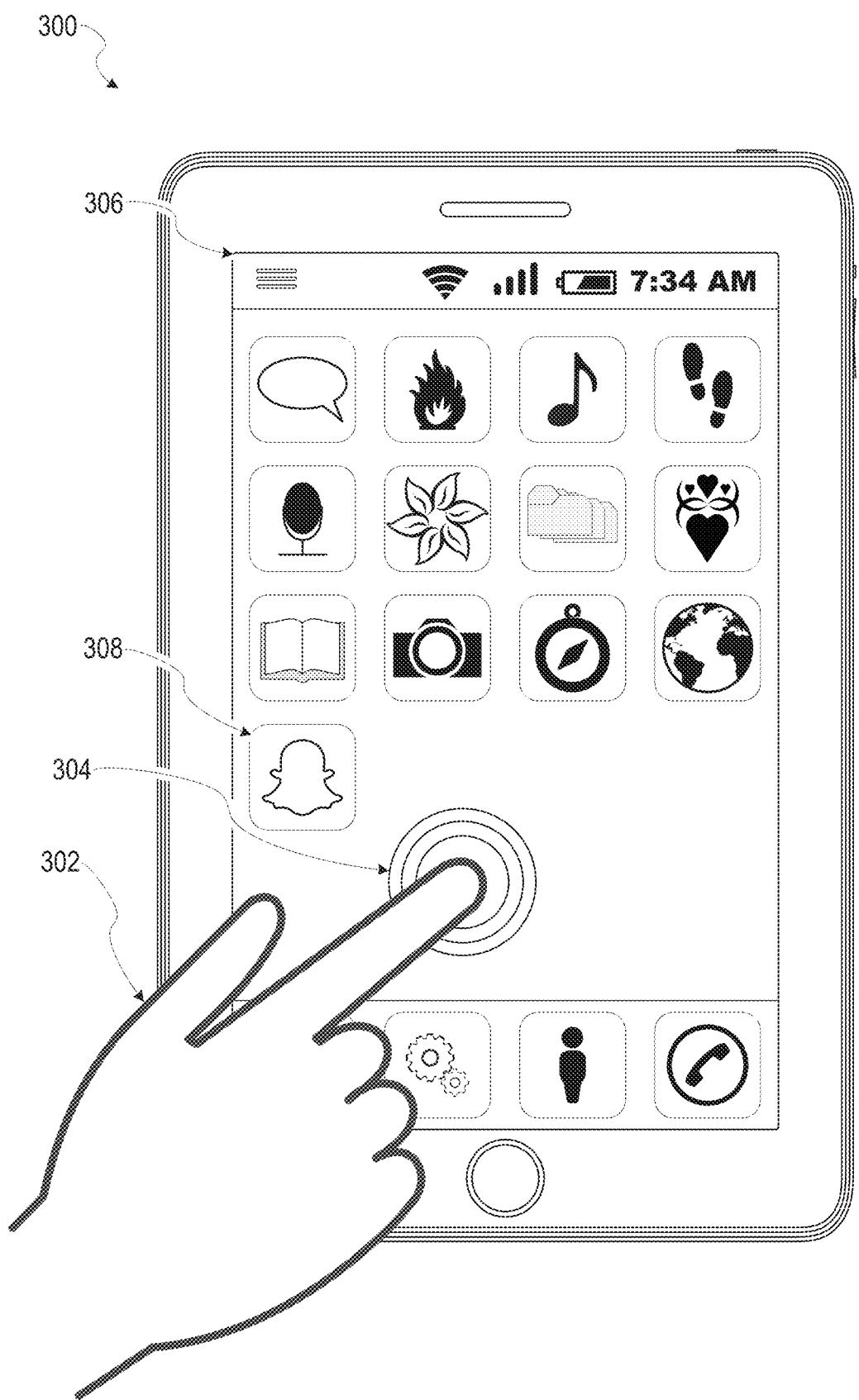
FIG. 3D illustrates additional aspects of the user interface of the device for use with the ethereal message communication system according to the example embodiment of FIGS. 3A-C.

FIG. 3D illustrates an example mobile device 300 executing a mobile operating system, consistent with some embodiments. In one embodiment, the mobile device 300 includes a touch screen operable to receive tactile data from a user 302. For instance, the user 302 may physically touch the mobile device 300 at a touch point 304, and in response to the touch, the mobile device 300 may determine tactile data such as touch location, touch force, or gesture motion. In various example embodiments, the mobile device 300 displays a home screen 306 (e.g., Springboard on IOS™) operable to launch applications or otherwise manage various aspects of the mobile device 300. In some example embodiments, the home screen 306 provides status information such as battery life, connectivity, or other hardware statuses. The user 302 can activate user interface elements by touching an area occupied by a respective user interface element. In this manner, the user 302 interacts with the applications of the mobile device 300. For example, touching the area occupied by a particular icon included in the home screen 306 causes launching of an application corresponding to the particular icon.

Many varieties of applications (also referred to as "apps") can be executing on the mobile device 300, such as native applications (e.g., applications programmed in Objective-C, Swift, or another suitable language running on IOS™, or applications programmed in Java running on ANDROID™), mobile web applications (e.g., applications written in Hypertext Markup Language-5 (HTML5)), or hybrid applications (e.g., a native shell application that launches an HTML5 session). For example, the mobile device 300 includes a messaging app, an audio recording app, a camera app, a book reader app, a media app, a fitness app, a file management app, a location app, a browser app, a settings app, a contacts app, a telephone call app, or other apps (e.g., gaming apps, social networking apps, biometric monitoring apps). In another example, the mobile device 300 includes a social messaging app 308 such as SNAPCHAT® that, consistent with some embodiments, allows users to exchange ephemeral messages that include media content. In this example, the social messaging app 308 can incorporate aspects of embodiments described herein.

Figure 4:
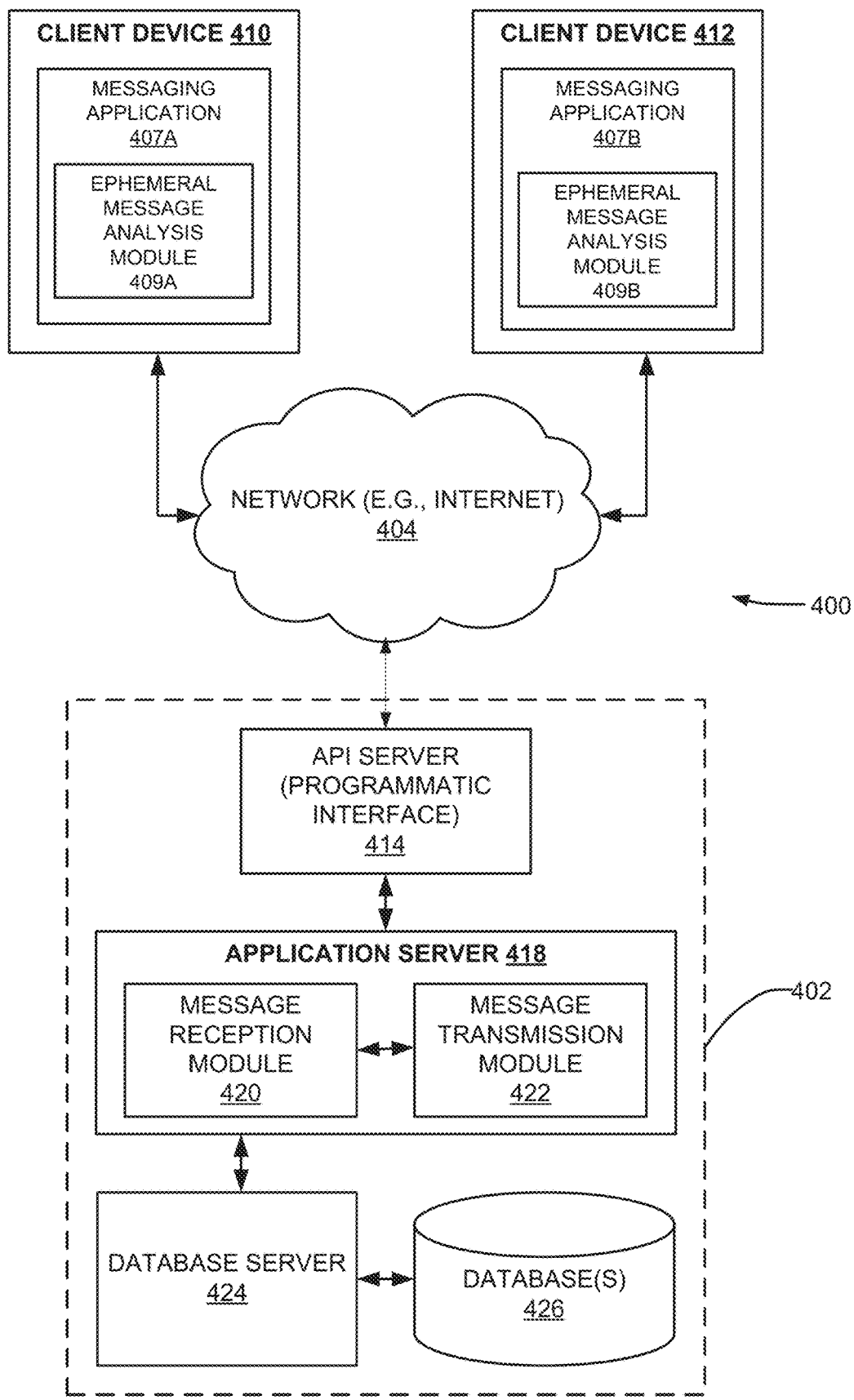
FIG. 4 is a diagram illustrating a network system that may be used for ephemeral communications according to some example embodiments.

FIG. 4 is a diagram illustrating a network system 400 that may be used for ephemeral communications according to some example embodiments. The network system 400 has a client-server architecture configured for exchanging data over a network, according to one embodiment. Although the network system 400 is illustrated herein as having a client-server architecture, other embodiments may include other network architectures, such as peer-to-peer or distributed network architectures.

The network system 400 includes a client device 410 and a client device 412 communicatively coupled to each other and to a data exchange platform 402 via a network 404 (e.g., the Internet). The data exchange platform 402, in an example, includes a message reception module 420 and a message transmission module 422, and may provide server-side functionality via the network 404 to one or more clients. Although the message reception module 420 and the message transmission module 422 are described as residing on a server (e.g., application server(s) 418) in some embodiments, in other embodiments some or all of the functions of the message reception module 420 and the message transmission module 422 may be provided by a client device. The one or more clients may include users that use the network system 400 to exchange data over the network 404. These operations may include transmitting, receiving (communicating), and processing data to, from, and regarding content and users of the network system 400. The data may include, but is not limited to, content and user data such as user profiles, messaging content, messaging attributes, client device information, and geolocation information, among others.

In various embodiments, the data exchanges within the network system 400 may be dependent upon user-selected functions available through one or more client or user interfaces (UIs). The UIs may be associated with a client machine, such as the client devices 410, 412 using instances of a messaging application 407A, 407B on each device, such as a client application. The messaging application 407 may be in communication with the message reception module 420 and the message transmission module 422 via an application server 418. The client devices 410, 412 may comprise mobile devices with wireless communication components and applications for sending specific types of electronic messages (e.g., ephemeral messages) over the network 404 (e.g., using messaging application 407).

Figure 5:
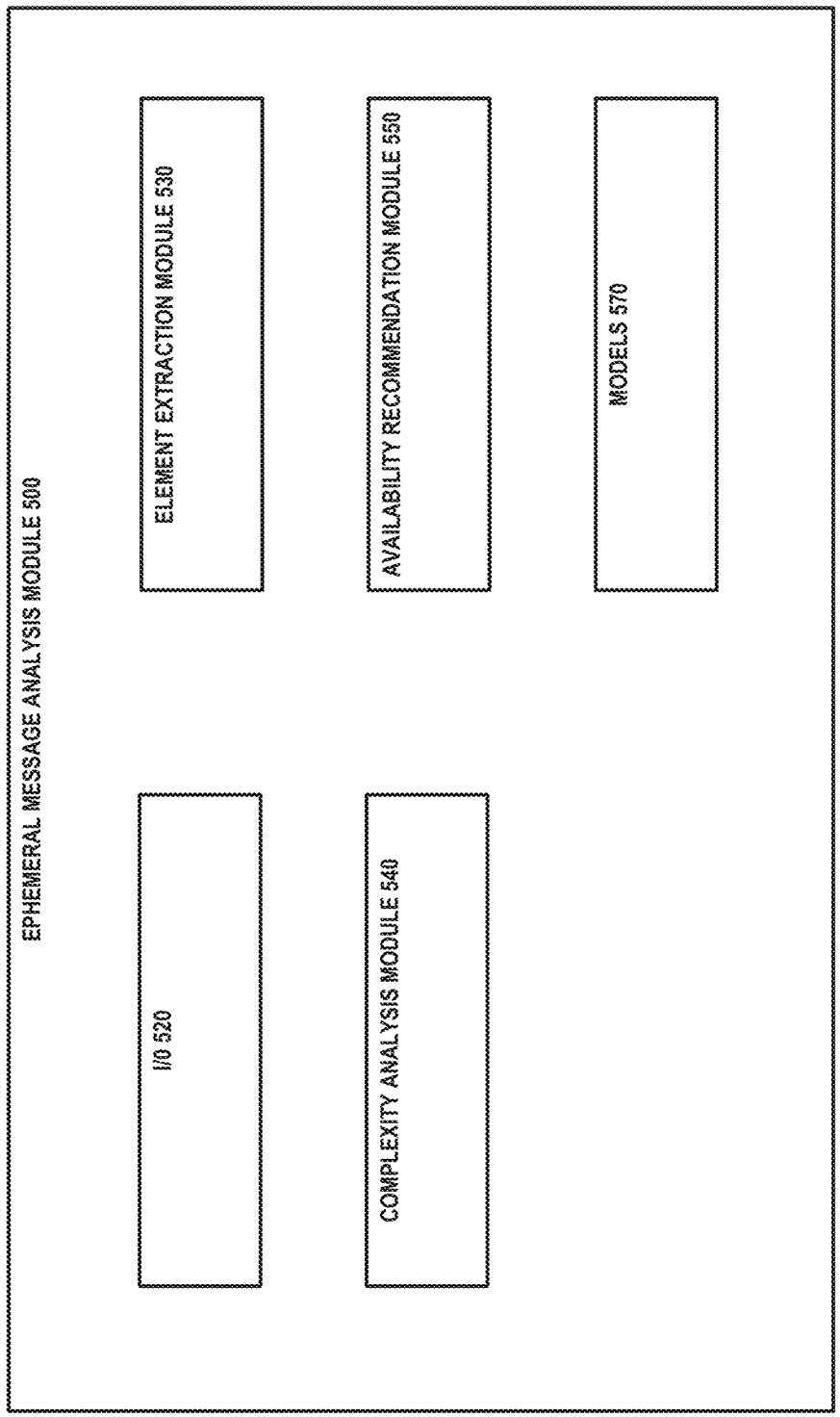
FIG. 5 is a diagram illustrating aspects of one implementation of an ephemeral message analysis module for use with some embodiments.

In addition to the system managing communication and storage of messages among the client device 410, the client device 412, and the application server 418, the different messaging applications 407A and 407B operating on the corresponding client devices 410 and 412 have respective ephemeral message analysis modules 409A and 409B. In various embodiments, these ephemeral message analysis modules 409A, 409B may analyze outgoing or incoming messages based on different elements of the messages such as the complexity of content to be displayed to a user, in order to recommend or determine how an ephemeral message should be presented on a receiving device, and the deletion triggers to be associated with a message. FIG. 5 is a diagram illustrating aspects of one implementation of an ephemeral message analysis module 500 for use with some embodiments. In some embodiments of the network system 400, the ephemeral message analysis modules 409A and 409B are similar to the ephemeral analysis module 500. In other embodiments, implementations with different modules or module combinations are possible. Additional details related to the ephemeral message analysis module 400 are discussed below.

An application program interface (API) server 414 is coupled to, and provides a programmatic interface to, the one or more application server(s) 418 that host the message reception module 420 and the message transmission module 422. The application server 418 is, in turn, shown to be coupled to one or more database servers 424 that facilitate access to one or more database(s) 426. The one or more database(s) 426 may store copies of messages sent to and from the client devices 410, 412, and may communicate with the client devices 410, 412 to delete ephemeral messages when deletion triggers occur at the client devices 410, 412.

The API server 414 communicates and receives data pertaining to messages, among other things, via various user input tools. For example, the API server 414 may send and receive data to and from an application (e.g., via the messaging application 407) running on another client machine (e.g., client devices 410, 412 or a third-party server).

In one example embodiment, the message reception module 420 provides messaging functionality for users of the client devices 410, 412 to send ephemeral messages that automatically disappear after a triggering event has been detected. For example, the messages may disappear after they have been viewed by the recipient for a specified period of time determined as part of ephemeral message analysis described herein. The client devices 410, 412 can access and view the messages via the application server(s) 418, which may access the message content from, for example, the database(s) 426, which, as mentioned above, works with other aspects of the system to delete ephemeral messages at the appropriate time.

Various different triggering events may be used to initiate deletion of an ephemeral message, as described above. In an additional embodiment, the triggering event for deleting a message comprises a responding to the message at the client device 412 prior to the expiration of the specified time period, for example, by sending a return message prior to the expiration of the specified time period without closing the messaging application 407. Any such time period or trigger may be set automatically in response to an analysis of an ephemeral message, with a result specified by models and user settings used in the ephemeral message analysis.

FIG. 5 is a diagram illustrating aspects of one implementation of an ephemeral message analysis module 500 for use with some embodiments. The ephemeral analysis module 500 includes an input/output (I/O) module 520, an element extraction module 530, a complexity analysis module 540, an availability recommendation module 550, and other models 570.

The I/O module 520 manages data storage and communication for the various modules, as well as accepting message information and providing one or more availability recommendations. In some embodiments, the output may be a simple numerical recommendation value for an availability time or a number of video clip views. In some embodiments, an insufficient information or uncertainty thresholds may be included. For example, in some embodiments, an uncertainty associated with a message status may be used by an application operating on a client device to prompt a user for action regarding a message. In other embodiments, an uncertain decision may prompt a communication to a sending device or a system server computer for a decision or additional information about an availability or deletion trigger value. In still further embodiments, more complex analysis decisions may be output using the I/O module 520, such as decision information regarding specific deletion trigger changes.

The element extraction module 530 may take the message input and may extract different parts of the message. For example, metadata may be identified or messages with multiple image or video may have different content elements identified. These elements may be analyzed or used in various different ways by the different analysis modules and models.

A complexity analysis module 540 may then take some or all of the elements of an ephemeral message to determine a complexity value for the message. In one embodiment, the complexity analysis module may implement an algorithm for determining a message complexity based on compressed and uncompressed file sizes of images or video clips associated with an ephemeral message. Some compression algorithms operate by reducing a file size where simple backgrounds or simple repeated information may be replaced with more compactly represented information. Thus, comparing an uncompressed image of a particular resolution with a file size of a corresponding compressed version of the image may be used to set a complexity value for the image, which may be considered as part of a complexity value for an ephemeral message containing the image. If the ephemeral message is a message to display the image, the complexity value for the image may be the complexity value for the ephemeral message. If the ephemeral message includes multiple images or relevant metadata, then other complexity information may be used to generate a complexity value for the associated ephemeral message.

In another embodiments, complexity analysis module 540 may use image recognition to identify objects in an image or video clip, and may base a complexity value for an ephemeral message based on objects identified in one or more images or video clips that are part of the ephemeral message. A simple example of such an implementation of a complexity analysis module 540 may implement an algorithm to identify each instance of a face in an image. Such an algorithm need not identify faces, but may simply determine that an image area is associated with a face. In video clip analysis, such an algorithm may track faces across frames without identifying a face. Such an analysis may be used to set a complexity based simply on the number of faces in an ephemeral message. Other similar embodiments may include more complex tracking of objects other than or in addition to faces. Still other embodiments may track additional information such as the level of fine details, foreground and background complexity, blur that may make user evaluation of the image more difficult, text and any associated text complexity (e.g. complex difficult to read fonts either as text or in an image or video clip), or any other such analysis of complexity may be used. In some embodiments, spatial frequencies of content in an image may be analyzed, with images having certain spatial frequency characteristics associated with different complexity values.

An availability recommendation module 550 then takes complexity information from complexity analysis module 540 and translates the complexity information into a value associated with the availability limits in an ephemeral message communication system. If, for example, an ephemeral message system is structured to communicate individual images, with images presented on time for up to a trigger time limit that varies from one second to ten seconds, the availability recommendation module 550 may take a complexity value and translate the complexity value into a recommended availability within one and ten seconds. This recommendation may be generated from a model based on training data from users, or based on information generated for system use. For example, a table generated for system use may match a number of simple faces (e.g. in images with insignificant other information than the faces) in an image to a recommended availability time. Metadata or information about an individual user of a receiving device may also be used to modify such recommendations.

For example, a system may track that a first user of a first device tends, based on historically captured data, to view faces for a longer period of time than a second user of a second device. Such information may be tracked privately by an ephemeral message analysis module 500 of an individual device and not by a shared system server computer. The individual devices analysis module may then customize the availability recommendation for an individual user or device. In other embodiments, such analysis may be done at a system server level, either for individual users if a setting is accepted by the user, or on a global level using data that has identification of individual senders or receivers removed.

Other embodiments may include other availability recommendations. For example, a system for ephemeral communication that includes videos may allow a receiving device or account to initiate playback of a video clip a certain number of times. Such a system may prevent pause of the video clip, and may count a terminated instance of playback as one of the allowable instances before the message is deleted. An availability recommendation module 550 in such a system may be used to select a higher number of viewings based on a complexity analysis of the video clip that is part of the ephemeral message, and an associated deletion trigger may be set to delete the ephemeral message after the final viewing of the video clip either finishes or is terminated (e.g. by a user navigating away from display of the video clip or a device software crashing or otherwise presenting an error during playback of the video clip).

In addition to these models, the other models 570 may be used either in conjunction with the above modules or in place of the above modules in different embodiments. Examples of additional machine learning modules include Bayesian network modules, decision tree modules, neural network modules, relevance vector machine modules, or other such machine implemented classification modules to select specific availability or complexity values as part of an analysis of a message.

In some implementations of an ephemeral message analysis module, a complexity analysis module may analyze the edges in an image or in the frames of a video clip by breaking each analyzed image into segments, and identifying whether a segment includes an edge or not. Various processes for breaking an image into segments may be used, such as an initial set of segments following a geometric pattern, and additional subsegments for some or all of the initial segments if some of the initial segments include multiple edges. The number of edge segments and the size or complexity of the edge segments may then be used to determine a complexity value. In other embodiments, any other complexity value may be combined with such an edge based complexity, to generate multiple complexity values or a single combined complexity value that may be used by a model to recommend an availability value.

In some implementations, a multiple class classification algorithm may be used to create a model that generates an availability recommendation using complexity values. For example, each class of a classification algorithm may be a single availability time, with each availability time set as a separate class in a model. A system allowing availability times of 1 second, 5 seconds, and 10 seconds, would thus have three classes, with one class for each availability time. A system allowing availability values of one, two, three, or four viewings for a video clip would have four classes. A multiple class classification algorithm would accept one or more complexity values, or any other information about an image or video clip that is used to determine availability value, and select a class from the available classes based on the particular classification algorithm. In various embodiments, different linear classification algorithms, support vector machine algorithms, neural networks, learning vector quantization, or other such algorithms may be used to classify content in a message.

In some implementations, a value regression algorithm may be used to create a model that generates an availability recommendation for given ranges of complexity values. Similar to the multiple class classification discussion above, any regression algorithm that is able to accept a complexity input and select an availability value may be used. When a continuous value is output as part of the regression, the model may then simply round to a particular value that is accepted by the communication system. For example, in a system that allows availability times of 1 second, 5 seconds, 10 seconds, and 15 seconds, if a regression recommends 9.324 seconds, the system may simply round to the nearest value of 10 seconds. In a system allowing any 1 second interval from 0 seconds to 10 seconds, a regression output of 8.5 seconds may be rounded up to a 9 second availability.

As described above, models may be generated using training data based on test images and viewing times of test users, or may be based on selected datasets with complexity values and availability values selected by a system designer, and not associated with any particular images or video clips. In still further embodiments, simpler systems without a complex model may be used, for example, with a simple matching table that matches ranges of complexity values to availability values as selected by a system operator.

Figure 6:
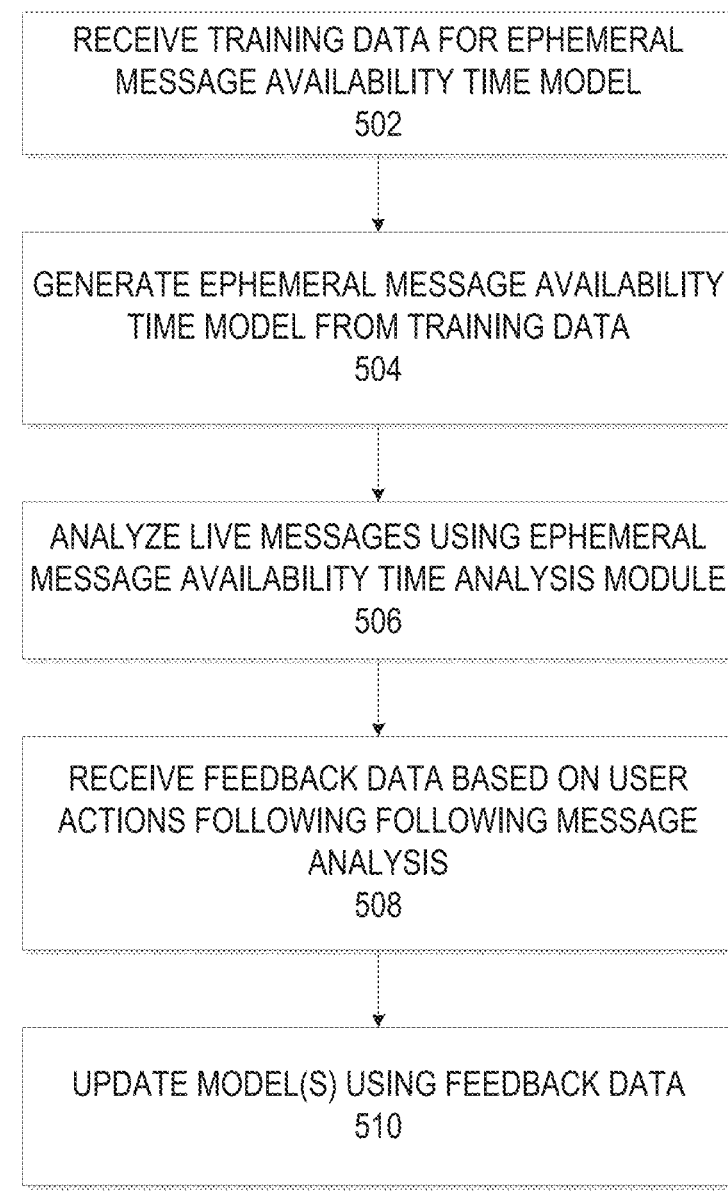
FIG. 6 describes a method for analyzing and processing messages according to some example embodiments.

FIG. 6 illustrates a method 600 for generating models or sets of analysis instructions for an ephemeral message analysis to be performed by a device. The method 600 begins with operation 602, involving a system receiving training data for an ephemeral message analysis model. This may include various examples of data tracking the viewing patterns or viewing time associated with a particular ephemeral message, as well as complexity values for the ephemeral message using a complexity module similar to the one to be used during live system operation. This information is then analyzed using a training algorithm to generate a model, using techniques for the associated supervised machine learning processes, in operation 604. In operation 606, the model generated using training data in operation 604 is used classify live chat messages using the model as integrated in an ephemeral message analysis module. Additionally, data regarding user actions or an absence of user actions taken toward the messages may be stored as feedback data in operation 608. For example, as described above, a user screenshot of a chat message classified as ephemeral may be stored as feedback data contradicting the classification of the message as ephemeral. The live message data may then be incorporated with the additional user action data gathered following classification of the live data to either confirm or contradict the generated classification. These confirmations and contradictions may be used as feedback data to update the ephemeral message analysis model(s) in operation 610.

Figure 7:
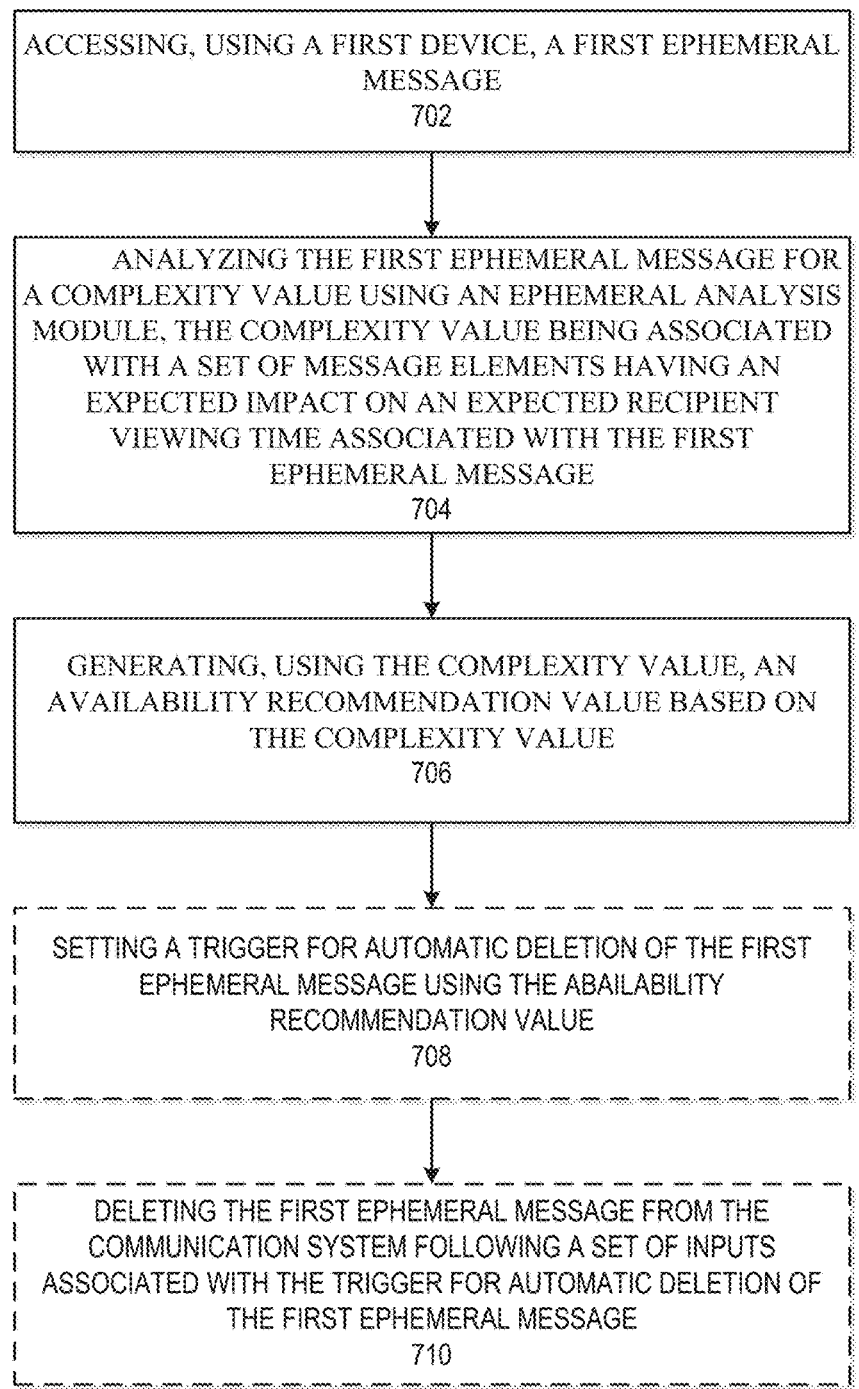
FIG. 7 describes a method for analyzing and processing messages according to some example embodiments.

FIG. 7 describes a method 700 for analyzing and processing ephemeral messages according to some example embodiments. The method 700 is a method performed by a device such as the client devices 130A. 130B, mobile devices 115A, 115B, or client devices 310, 312. The method 700 begins with operation 702, which involves accessing a first ephemeral message in a communication system. As discussed above, messages in an ephemeral communication system may be associated with a deletion trigger as a default condition, such that the use of the default trigger for deletion of the message following a basic interaction with the message is a default for all messages in the system.

Operation 704 involves analyzing the first ephemeral message for complexity to determine an automated recommendation for how the first ephemeral message should be presented to the user. "Complexity" as described herein refers to any value or characteristic of data in a message that is correlated with a need for longer display time to enable a viewer to absorb the information. Complexity may thus refer to both the amount of detail in an image, a difficulty in expected interpretation of an image, or any other such characteristic of the information in an ephemeral message that may be associated by the system with a longer display time or a need for repeat viewing of video clips. At operation 706, the complexity value resulting from the analysis of operation 704 is used to generate an availability recommendation value. This availability recommendation value may be a number of acceptable views, a total viewing time, a combination of the two (e.g. one allowable view for a maximum of five seconds; also e.g. three allowable views for a maximum of five seconds; and also e.g. any number of allowable views for a maximum of five seconds.) A view in such embodiments refers to separate instances of an image being displayed on an output device with the output terminated prior to the next view beginning.

In certain embodiments, the availability recommendation value may be separate from a deletion trigger. In such embodiments, operation 708 may be used to set one or more deletion triggers and to implement a system process for monitoring device operations to verify when a deletion trigger has had requirements met. When the requirements of a deletion trigger are then met, in operation 710 the content of the ephemeral message is deleted from the system. This may include deletion from a system server that operates as an intermediary to relay messages between devices as well as deletion of the message on any receiving device. In some embodiments, the deletion trigger having been met may also be communicated to the sending device to have content associated with the message deleted at the sending device as well.

While the methods described above present operations in a particular order, it will be appreciated that alternate embodiments may operate with certain operations occurring simultaneously or in a different order. In many such embodiments, the order and timing of operations may vary between instances of the operations.

Certain embodiments are described herein as including logic or a number of components, modules, elements, or mechanisms. Such modules can constitute either software modules (e.g., code embodied on a machine-readable medium or in a transmission signal) or hardware modules. A "hardware module" is a tangible unit capable of performing certain operations and can be configured or arranged in a certain physical manner. In various example embodiments, one or more computer systems (e.g., a standalone computer system, a client computer system, or a server computer system) or one or more hardware modules of a computer system (e.g., a processor or a group of processors) is configured by software (e.g., an application or application portion) as a hardware module that operates to perform certain operations as described herein.

In some embodiments, a hardware module is implemented mechanically, electronically, or any suitable combination thereof. For example, a hardware module can include dedicated circuitry or logic that is permanently configured to perform certain operations. For example, a hardware module can be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module can include software encompassed within a general-purpose processor or other programmable processor. It will be appreciated that the decision to implement a hardware module mechanically, in dedicated and permanently configured circuitry, or in temporarily configured circuitry (e.g., configured by software) can be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software can accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module performs an operation and stores the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the processors, not only residing within a single machine, but deployed across a number of machines. In some example embodiments, the processors or processor-implemented modules are located in a single geographic location (e.g., within a home environment, an office environment, or a server farm). In other example embodiments, the processors or processor-implemented modules are distributed across a number of geographic locations.

Figure 8:
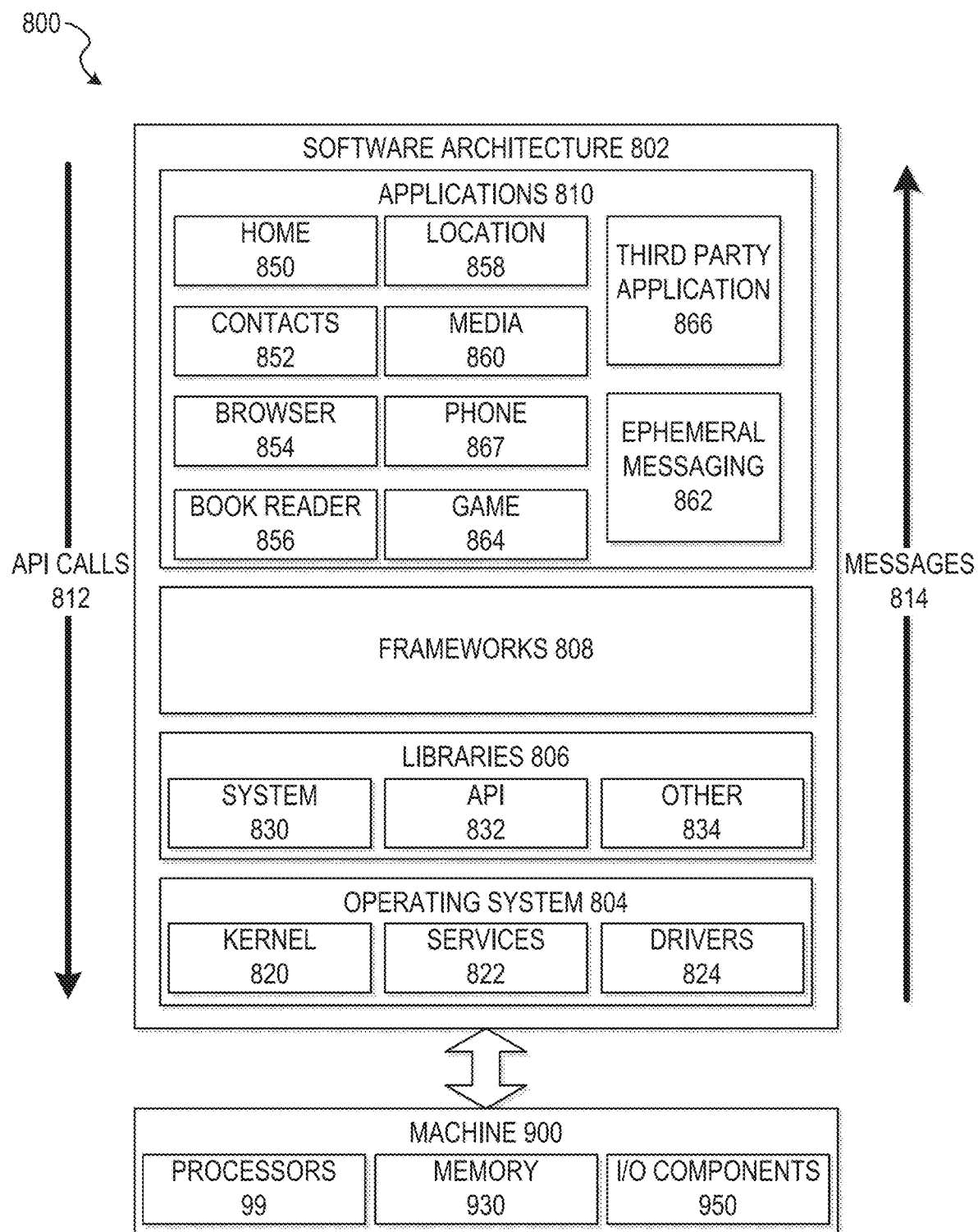
FIG. 8 is a block diagram illustrating an example of a software architecture that may be installed on a machine, according to some example embodiments.

FIG. 8 is a block diagram 800 illustrating architecture of software 802, which can be installed on any one or more of the devices described above. FIG. 8 is merely a non-limiting example of a software architecture, and it will be appreciated that many other architectures can be implemented to facilitate the functionality described herein. In various embodiments, the software 802 is implemented by hardware such as a machine 900 of FIG. 9 that includes processors 910, memory 930, and I/O components 950. In this example architecture, the software 802 can be conceptualized as a stack of layers where each layer may provide a particular functionality. For example, the software 802 includes layers such as an operating system 804, libraries 806, frameworks 808, and applications 810. Operationally, the applications 810 invoke application programming interface (API) calls 812 through the software stack and receive messages 814 in response to the API calls 812, consistent with some embodiments.

In various implementations, the operating system 804 manages hardware resources and provides common services. The operating system 804 includes, for example, a kernel 820, services 822, and drivers 824. The kernel 820 acts as an abstraction layer between the hardware and the other software layers, consistent with some embodiments. For example, the kernel 820 provides memory management, processor management (e.g., scheduling), component management, networking, and security settings, among other functionality. The services 822 can provide other common services for the other software layers. The drivers 824 are responsible for controlling or interfacing with the underlying hardware, according to some embodiments. For instance, the drivers 824 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 806 provide a low-level common infrastructure utilized by the applications 810. The libraries 806 can include system libraries 830 (e.g., C standard library) that can provide functions such as memory allocation functions, string manipulation functions, mathematic functions, and the like. In addition, the libraries 806 can include API libraries 832 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 806 can also include a wide variety of other libraries 834 to provide many other APIs to the applications 810.

The frameworks 808 provide a high-level common infrastructure that can be utilized by the applications 810, according to some embodiments. For example, the frameworks 808 provide various graphic user interface (GUI) functions, high-level resource management, high-level location services, and so forth. The frameworks 808 can provide a broad spectrum of other APIs that can be utilized by the applications 810, some of which may be specific to a particular operating system or platform.

In an example embodiment, the applications 810 include a home application 850, a contacts application 852, a browser application 854, a book reader application 856, a location application 858, a media application 860, a phone application 867, an ephemeral messaging application 862, a game application 864, and a broad assortment of other applications such as a third-party application 866. According to some embodiments, the applications 810 are programs that execute functions defined in the programs. Various programming languages can be employed to create one or more of the applications 810, structured in a variety of manners, such as object-oriented programming languages (e.g., Objective-C, Java, or C++) or procedural programming languages (e.g., C or assembly language). In a specific example, the third-party application 866 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 866 can invoke the API calls 812 provided by the operating system 804 to facilitate functionality described herein.

Figure 9:
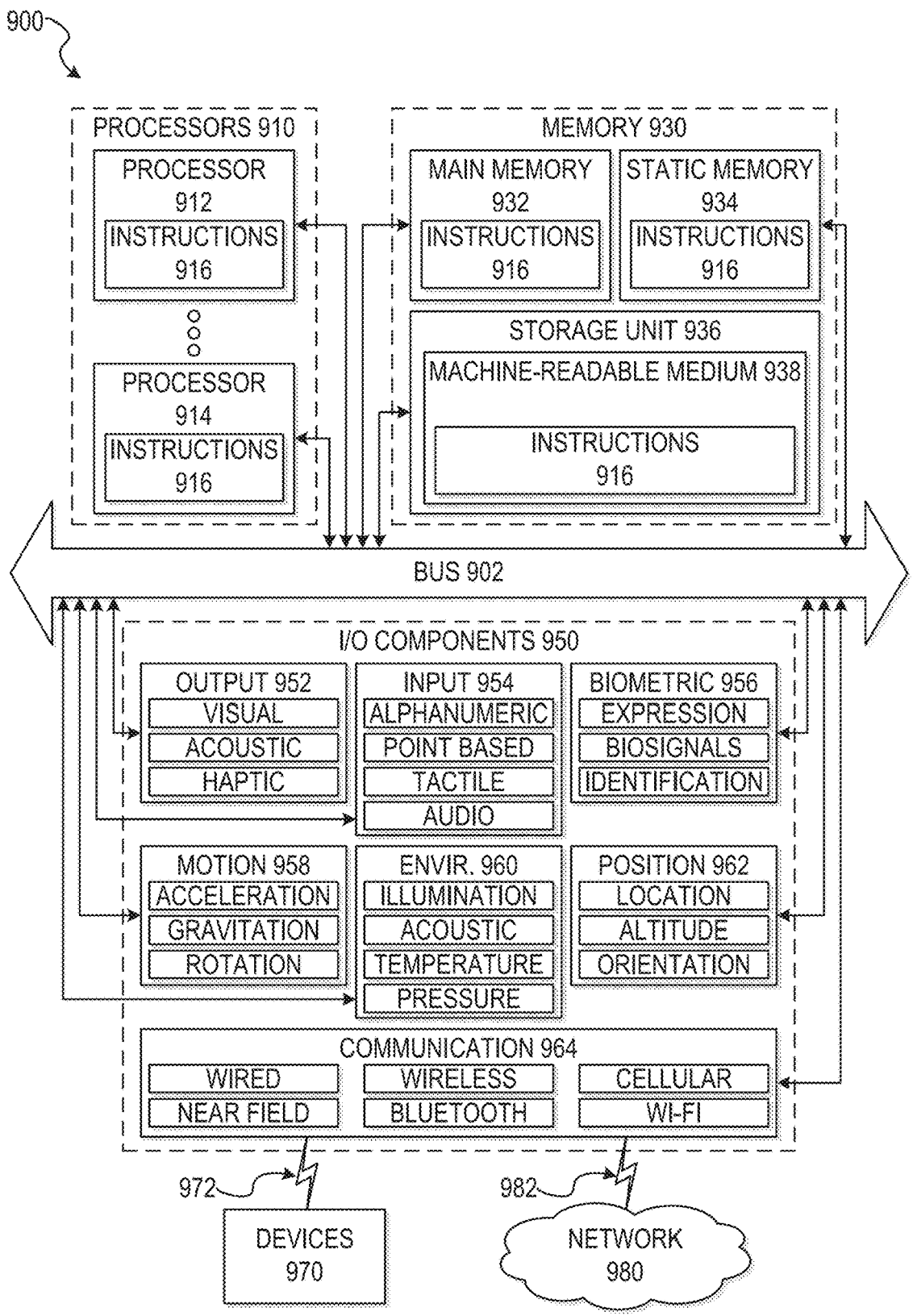
FIG. 9 is a diagrammatic representation of a machine in the form of a computer system within which a set of instructions may be executed for causing the machine to perform any one or more of the methodologies discussed herein, according to an example embodiment.

FIG. 9 is a block diagram illustrating components of a machine 900, according to some embodiments, able to read instructions from a machine-readable medium (e.g., a machine-readable storage medium) and perform any one or more of the methodologies discussed herein. Specifically, FIG. 9 shows a diagrammatic representation of the machine 900 in the example form of a computer system, within which instructions 916 (e.g., software, a program, an application, an applet, an app, or other executable code) for causing the machine 900 to perform any one or more of the methodologies discussed herein can be executed. In alternative embodiments, the machine 900 operates as a standalone device or can be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 can comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 916, sequentially or otherwise, that specify actions to be taken by the machine 900. Further, while only a single machine 900 is illustrated, the term "machine" shall also be taken to include a collection of machines 900 that individually or jointly execute the instructions 916 to perform any one or more of the methodologies discussed herein.

In various embodiments, the machine 900 comprises processors 910, memory 930, and I/O components 950, which can be configured to communicate with each other via a bus 902. In an example embodiment, the processors 910 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) include, for example, a processor 912 and a processor 914 that may execute the instructions 916. The term "processor" is intended to include multi-core processors that may comprise two or more independent processors (also referred to as "cores") that can execute instructions contemporaneously. Although FIG. 9 shows multiple processors 910, the machine 900 may include a single processor with a single core, a single processor with multiple cores (e.g., a multi-core processor), multiple processors with a single core, multiple processors with multiples cores, or any combination thereof.

The memory 930 comprises a main memory 932, a static memory 934, and a storage unit 936 accessible to the processors 910 via the bus 902, according to some embodiments. The storage unit 936 can include a machine-readable medium 938 on which are stored the instructions 916 embodying any one or more of the methodologies or functions described herein. The instructions 916 can also reside, completely or at least partially, within the main memory 932, within the static memory 934, within at least one of the processors 910 (e.g., within the processor's cache memory), or any suitable combination thereof, during execution thereof by the machine 900. Accordingly, in various embodiments, the main memory 932, the static memory 934, and the processors 910 are considered machine-readable media 938.

As used herein, the term "memory" refers to a machine-readable medium 938 able to store data temporarily or permanently and may be taken to include, but not be limited to, random-access memory (RAM), read-only memory (ROM), buffer memory, flash memory, and cache memory. While the machine-readable medium 938 is shown in an example embodiment to be a single medium, the term "machine-readable medium" should be taken to include a single medium or multiple media (e.g., a centralized or distributed database, or associated caches and servers) able to store the instructions 916. The term "machine-readable medium" shall also be taken to include any medium, or combination of multiple media, that is capable of storing instructions (e.g., instructions 916) for execution by a machine (e.g., machine 900), such that the instructions, when executed by one or more processors of the machine 900 (e.g., processors 910), cause the machine 900 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., Erasable Programmable Read-Only Memory (EPROM)), or any suitable combination thereof. The term "machine-readable medium" specifically excludes non-statutory signals per se.

The I/O components 950 include a wide variety of components to receive input, provide output, produce output, transmit information, exchange information, capture measurements, and so on. In general, it will be appreciated that the I/O components 950 can include many other components that are not shown in FIG. 9. The I/O components 950 are grouped according to functionality merely for simplifying the following discussion, and the grouping is in no way limiting. In various example embodiments, the I/O components 950 include output components 952 and input components 954. The output components 952 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 954 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 950 include biometric components 956, motion components 958, environmental components 960, or position components 962, among a wide array of other components. For example, the biometric components 956 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 958 include acceleration sensor components (e.g., accelerometer), gravitation sensor components, rotation sensor components (e.g., gyroscope), and so forth. The environmental components 960 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 962 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 950 may include communication components 964 operable to couple the machine 900 to a network 980 or devices 970 via a coupling 982 and a coupling 972, respectively. For example, the communication components 964 include a network interface component or another suitable device to interface with the network 980. In further examples, the communication components 964 include wired communication components, wireless communication components, cellular communication components, Near Field Communication (NFC) components, BLUETOOTH® components (e.g., BLUETOOTH® Low Energy), WI-FI® components, and other communication components to provide communication via other modalities. The devices 970 may be another machine or any of a wide variety of peripheral devices (e.g., a peripheral device coupled via a Universal Serial Bus (USB)).

Moreover, in some embodiments, the communication components 964 detect identifiers or include components operable to detect identifiers. For example, the communication components 964 include Radio Frequency Identification (RFID) tag reader components, NFC smart tag detection components, optical reader components (e.g., an optical sensor to detect one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 964, such as location via Internet Protocol (IP) geolocation, location via WI-FI® signal triangulation, location via detecting a BLUETOOTH® or NFC beacon signal that may indicate a particular location, and so forth.

Transmission Medium

In various example embodiments, one or more portions of the network 980 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a WI-FI® network, another type of network, or a combination of two or more such networks. For example, the network 980 or a portion of the network 980 may include a wireless or cellular network, and the coupling 982 may be a Code Division Multiple Access (CDMA) connection, a Global System for Mobile communications (GSM) connection, or another type of cellular or wireless coupling. In this example, the coupling 982 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 916 are transmitted or received over the network 980 using a transmission medium via a network interface device (e.g., a network interface component included in the communication components 964) and utilizing any one of a number of well-known transfer protocols (e.g., Hypertext Transfer Protocol (HTTP)). Similarly, in other example embodiments, the instructions 916 are transmitted or received using a transmission medium via the coupling 972 (e.g., a peer-to-peer coupling) to the devices 970. The term "transmission medium" shall be taken to include any intangible medium that is capable of storing, encoding, or carrying the instructions 916 for execution by the machine 900, and includes digital or analog communications signals or other intangible media to facilitate communication of such software.

Furthermore, the machine-readable medium 938 is non-transitory (in other words, not having any transitory signals) in that it does not embody a propagating signal. However, labeling the machine-readable medium 938 "non-transitory" should not be construed to mean that the medium is incapable of movement; the machine-readable medium 938 should be considered as being transportable from one physical location to another. Additionally, since the machine-readable medium 938 is tangible, the machine-readable medium 938 may be considered to be a machine-readable device.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method of processing ephemeral messages in a communication system, the method comprising:
   accessing, using a first device comprising one or more processors, a first ephemeral message;
   analyzing the first ephemeral message for a complexity value using an ephemeral analysis module implemented using the one or more processors, the complexity value being associated with a set of message elements having an expected impact on an expected recipient viewing time associated with the first ephemeral message, and wherein the analyzing the first ephemeral message is performed in response to an availability setting interface selection between a specific availability increment and an automatic recommendation setting being selected for the automatic recommendation setting;
   generating, by the one or more processors using the complexity value, an availability recommendation value for a number of views of the first ephemeral message based on the complexity value, wherein the availability recommendation value is associated with a trigger for automatic deletion of the first ephemeral message following initiation of display of the first ephemeral message for the number of views.

2. The method of claim 1 wherein the first ephemeral message comprises a first image;
   wherein analyzing the first ephemeral message for the complexity value comprises identifying a number of faces in the first image; and
   wherein the complexity value is based at least in part on the number of faces identified in the first image.

3. The method of claim 1 wherein the complexity value is based, at least in part, on a difference between a compressed file size of the first ephemeral message and an uncompressed file size of the first ephemeral message.

4. The method of claim 1 wherein the first ephemeral message comprises a first video clip;
   wherein analyzing the first ephemeral message for the complexity value comprises analyzing sequential frames of the first video clip for differences between the sequential frames; and
   wherein the complexity value is based, at least in part, on the differences between the sequential frames of the first video clip.

5. The method of claim 1 further comprising sending, from the first device to a second device, the first ephemeral message with the trigger for automatic deletion.

6. The method of claim 5 further comprising:
   receiving, at the first device prior to the analyzing of the first ephemeral message, a user input selecting an ephemeral message analysis for the first ephemeral message;
   displaying, at an output display of the first device, a message associated with the availability recommendation value and the trigger; and
   receiving a user input accepting the availability recommendation value and the trigger;
   wherein the first ephemeral message is sent to the second device in response to the user input accepting the availability recommendation.

7. The method of claim 5 further comprising:
   receiving, prior to accessing the first ephemeral message, a first user input approving automatic acceptance of the availability recommendation value and the trigger;
   receiving a second user input to send the first ephemeral message to the second device;
   wherein the analysis of the first ephemeral message is performed in response to the second user input based on the first user input.

8. The method of claim 1 further comprising:
   receiving, at the first device from a second device, the first ephemeral message prior to accessing and analyzing the first ephemeral message;
   displaying one or more images of the first ephemeral message on a display of the first device for a first time based on the availability recommendation value; and
   deleting the first ephemeral message from the first device, following display of the one or more image, based on the trigger for automatic deletion of the first ephemeral message.

9. The method of claim 8 wherein the first ephemeral message comprises an indicator from the second device allowing an automatic selection of the trigger for automatic deletion of the first ephemeral message by the first device.

10. The method of claim 8 further comprising:
    communicating, from the first device to a server computer, notification of deletion of the first ephemeral message;
    wherein the message is received from the second device via the server computer.

11. The method of claim 1 further comprising:
    receiving, at the first device, the first ephemeral message from a second device, wherein the first device comprises a communications server computer for an ephemeral message service;
    analyzing the first ephemeral message to identify a third device to receive the first ephemeral message and an approval for automatic selection of the trigger for automatic deletion of the first ephemeral message by the third device; and
    sending the first ephemeral message to the third device with the trigger following the analyzing of the first ephemeral message for the complexity value and the generating of the trigger based on the complexity value.

12. The method of claim 1 wherein first ephemeral message comprises a video clip and a set of metadata, and wherein the trigger comprises a threshold number of two or more views and a deletion time frame, such that the system is prevented from pausing the video clip and a terminated instance of playback is counted as one of the number of views.

13. A computing system comprising:
    a memory configured to store a first ephemeral message;
    one or more processors coupled to the memory and configured to:
    analyze the first ephemeral message for a complexity value using an ephemeral analysis module, the complexity value being associated with a set of message elements having an expected impact on an expected recipient viewing time associated with the first ephemeral message, and wherein the analyzing the first ephemeral message is performed in response to an availability setting interface selection between a specific availability increment and an automatic recommendation setting being selected for the automatic recommendation setting;

generate, using the complexity value, an availability recommendation value for a number of views of the first ephemeral message that may be initiated by the one or more processors based on the complexity value, wherein the availability recommendation value is associated with a trigger for automatic deletion of the first ephemeral message.

14. The computing system of claim 13 wherein the one or more processors are further configured to analyze the first ephemeral message using an ephemeral message analysis module, wherein the ephemeral message analysis module comprises one or more image processing models to determine the complexity value.

15. The computing system of claim 14 wherein the once or more processors are configured to analyze the first ephemeral message by processing one or more images of the first ephemeral message to identify a number of face images in the first ephemeral message.

16. The computing system of claim 15 wherein the one or more processors are further configured to set the complexity value and the availability recommendation using the number of faces images in the first ephemeral message, wherein a number of faces below a first threshold is associated with a shorter availability recommendation, and a second number of faces above the first threshold is associated with a longer availability recommendation.

17. The computing system of claim 15 comprising an application programming interface server configured to receive the first ephemeral message from a first device and to communicate the first ephemeral message to a second client device with the trigger;

wherein the one or more processors are part of an application server executing the ephemeral message analysis module.

18. A non-transitory computer readable medium comprising computer readable instructions that, when executed by one or more processors of a first device, configure the one or more processors to:

access a first ephemeral message from a first memory of the first device;

analyze the first ephemeral message for a complexity value using an ephemeral analysis module, the complexity value being associated with a set of message elements having an expected impact on an expected recipient viewing time associated with the first ephemeral message, and wherein the analyzing the first ephemeral message is performed in response to an availability setting interface selection between a specific availability increment and an automatic recommendation setting being selected for the automatic recommendation setting; and generate, using the complexity value, an availability recommendation value for a number of views of the first ephemeral message based on the complexity value, wherein the availability recommendation value is associated with a trigger for automatic deletion of the first ephemeral message.

19. The non-transitory computer readable medium of claim 18 wherein the instructions further configure the one or more processors to:

receive, via an camera of the first device, a content element of the first ephemeral message; and receive, via an input module of the first device, an account identifier associated with a second device to identify the second device to receive the first ephemeral message.

20. The non-transitory computer readable medium of claim 19 wherein the instructions further configure the one or more processors to:

analyze the account identifier associated with the second device to determine that the second device is authorized to automatically determine the trigger for automatic deletion of the first ephemeral message.

* * * * *